United States Patent
Vossoughi et al.

(10) Patent No.: US 11,164,017 B2
(45) Date of Patent: Nov. 2, 2021

(54) PARKING OBJECTS DETECTION SYSTEM

(71) Applicant: CITIFYD, INC., Portland, OR (US)

(72) Inventors: Sohrab Vossoughi, Portland, OR (US); Dave Cole, Portland, OR (US); Massoud Mollaghaffari, Tigard, OR (US); Igor Cornelio Lira, Portland, OR (US); Gabriel Lopes, Florianópolis (BR)

(73) Assignee: Citifyd, Inc., Portland, OR (US)

( * ) Notice: Subject to any disclaimer, the term of this patent is extended or adjusted under 35 U.S.C. 154(b) by 0 days.

(21) Appl. No.: 16/619,607

(22) PCT Filed: Jun. 4, 2018

(86) PCT No.: PCT/US2018/035890
§ 371 (c)(1),
(2) Date: Dec. 5, 2019

(87) PCT Pub. No.: WO2018/226600
PCT Pub. Date: Dec. 13, 2018

(65) Prior Publication Data
US 2020/0134332 A1 Apr. 30, 2020

Related U.S. Application Data

(60) Provisional application No. 62/515,389, filed on Jun. 5, 2017.

(51) Int. Cl.
*G08G 1/065* (2006.01)
*G06K 9/00* (2006.01)
(Continued)

(52) U.S. Cl.
CPC ......... *G06K 9/00812* (2013.01); *G06F 9/466* (2013.01); *G08G 1/065* (2013.01);
(Continued)

(58) Field of Classification Search
CPC ........ G07B 15/02; H04W 4/029; H04W 4/80; H04W 4/021; H04W 4/70; G06Q 20/3224;
(Continued)

(56) References Cited

U.S. PATENT DOCUMENTS

2015/0077559 A1* 3/2015 Wu .................... H04N 5/23267
348/148
2015/0332517 A1 11/2015 Dutta et al.
(Continued)

FOREIGN PATENT DOCUMENTS

WO 2015172161 A1 11/2015
WO 2017096307 A1 6/2017

OTHER PUBLICATIONS

Soubam, Sonia et al., "BluePark: Tracking Parking and Un-parking Events in Indoor Parking Lot", Hit Delhi Institute Repository, Oct. 26, 2015, 10 pages.

*Primary Examiner* — Benyam Haile
(74) *Attorney, Agent, or Firm* — Stoel Rives LLP

(57) ABSTRACT

A parking objects or vehicles detection system (60) uses BLE proximity sensing to identify a vehicle (520) with a beacon ID to within about one vehicle length from an access gate (516) of a vehicle parking surface lot or garage. The system performs vision-based parking inventory management (514) by monitoring live vehicle ingress and egress traffic and communicating to a backend server (70) changes in instances of vehicle parking events.

17 Claims, 21 Drawing Sheets

(51) Int. Cl.
*H04W 4/029* (2018.01)
*H04W 4/80* (2018.01)
*G06F 9/46* (2006.01)
*G08G 1/14* (2006.01)

(52) U.S. Cl.
CPC ............ *G08G 1/146* (2013.01); *G08G 1/149* (2013.01); *H04W 4/029* (2018.02); *H04W 4/80* (2018.02)

(58) Field of Classification Search
CPC .............. G07F 17/246; G01C 21/3685; G06K 9/00812; G08G 1/065
See application file for complete search history.

(56) References Cited

U.S. PATENT DOCUMENTS

| | | | |
|---|---|---|---|
| 2015/0341901 A1* | 11/2015 | Ryu | ................ H04W 4/20 455/458 |
| 2016/0140846 A1 | 5/2016 | Outwater et al. | |
| 2017/0109942 A1* | 4/2017 | Zivkovic | ............... H04W 4/023 |
| 2017/0144654 A1* | 5/2017 | Sham | .................. G05D 1/0088 |
| 2018/0102860 A1* | 4/2018 | Emmanuel | ............ H04W 28/04 |
| 2018/0322349 A1* | 11/2018 | Hayakawa | ......... G06K 9/00825 |

\* cited by examiner

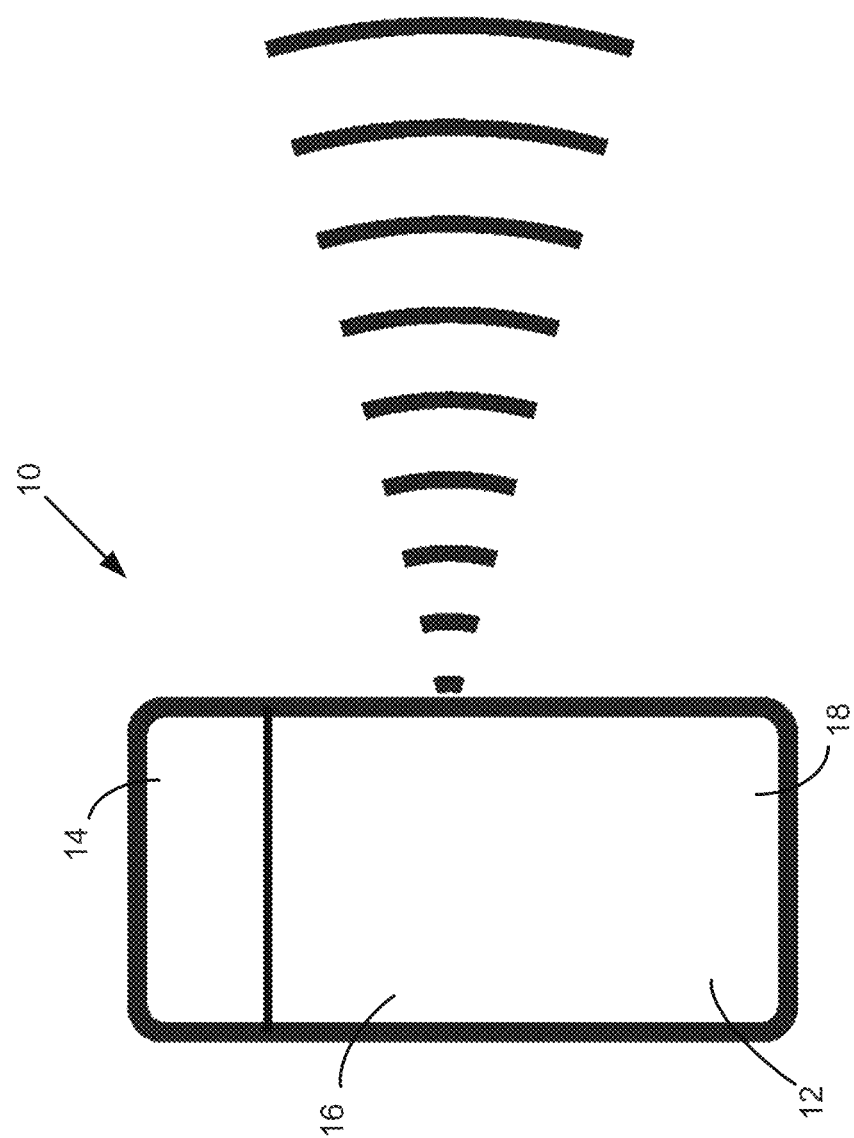

Communication/Activation
Device (Portable Display)

PARKING OBJECTS DETECTION SYSTEM

COPYRIGHT NOTICE

© 2018 Citifyd, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to use of Bluetooth Low-Energy (BLE) wireless personal area network proximity sensing to identify an object having a beacon identifier (ID) and, in particular, to detection of presence of a vehicle transporting an individual carrying a BLE-enabled smart device a short distance from an access gate to a vehicle parking location.

SUMMARY OF THE DISCLOSURE

The disclosed parking objects or vehicles detection system uses BLE proximity sensing to identify a vehicle with a beacon ID to within about one vehicle length from an access gate of a vehicle parking surface lot or garage. The system performs vision-based parking inventory management by monitoring live vehicle ingress and egress traffic and communicating to backend servers changes in instances of vehicle parking events.

Additional aspects and advantages will be apparent from the following detailed description of preferred embodiments, which proceeds with reference to the accompanying drawings.

BRIEF DESCRIPTION OF THE DRAWINGS

FIGS. 1, 2A, and 2B are, respectively, a simplified pictorial diagram, a component block diagram, and a software/hardware stack diagram of a source beacon of the present disclosure.

FIGS. 3A-1 and 3A-2, 3B-1 and 3B-2, and 3C are flow diagrams outlining the process steps performed cooperatively by the source beacon and a user smart device in initiating the start and the end of a vehicle parking or mass transit travel transaction session.

DETAILED DESCRIPTION OF PREFERRED EMBODIMENTS

The disclosed parking objects detection system includes an application program in which an algorithm operates to implement proximity detection using BLE to identify an object with a beacon ID to within one vehicle-length from an access gate. In the description below, Citifyd App (sometimes referred to as App) is the name given to a mobile application program operating with a user beacon on a user smart device, and SmartBeacon device is the name given a source beacon 10 (FIGS. 1, 2A, and 2B) associated with an access gate to a vehicle parking location. The Citifyd App and SmartBeacon device cooperate in a vehicle parking and mass transport beacon system, which is referred to as Citifyd system. Portions of International Application No. PCT/US16/64829, filed Dec. 2, 2016, for Vehicle Parking and Mass Transport Beacon System, are set forth with reference to FIGS. 1-8 to describe the main components and communication links between different ones of the main components of the Citifyd system. The Citifyd system includes one or more backend servers (backend servers) on which a parking or transportation service provider stores vehicle parking and transit rider customer account information and transaction information.

Figure 2A:
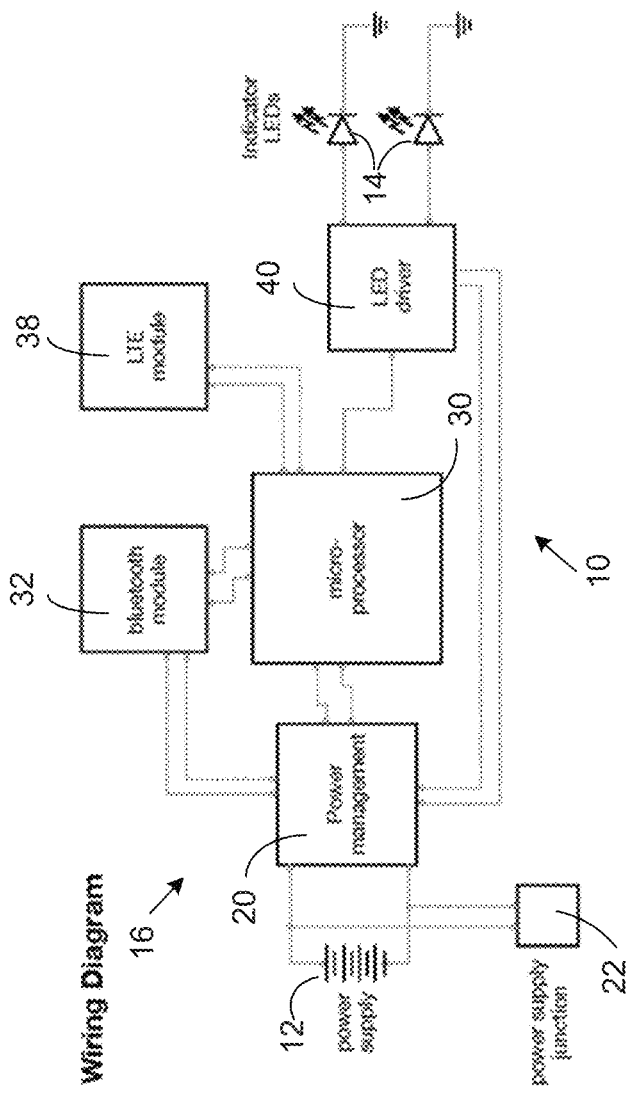
Figure 2B:
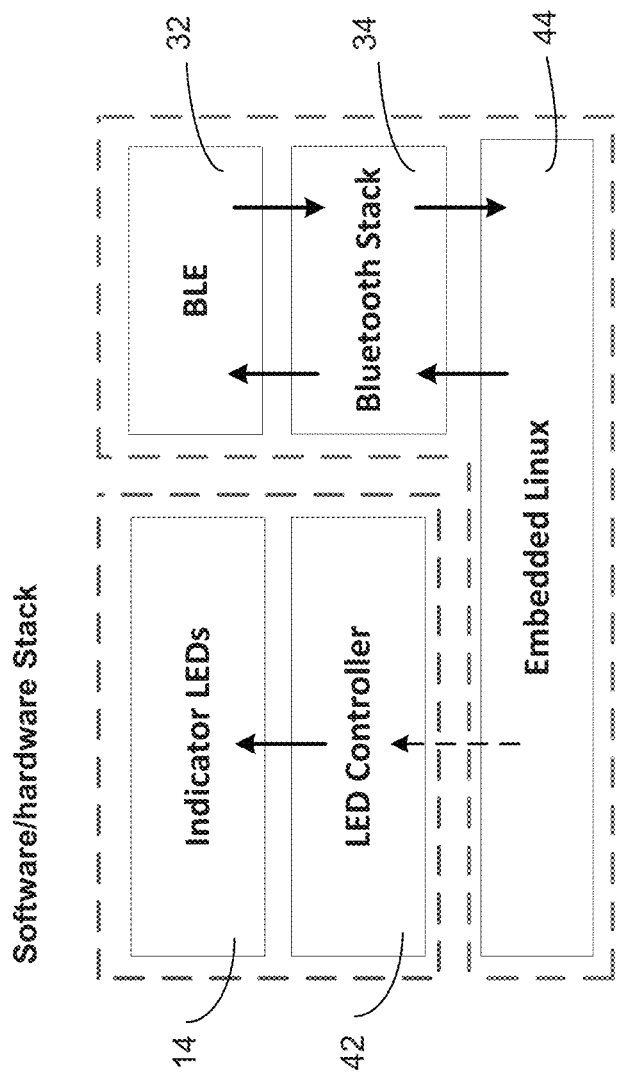
Figures 1, 3A:
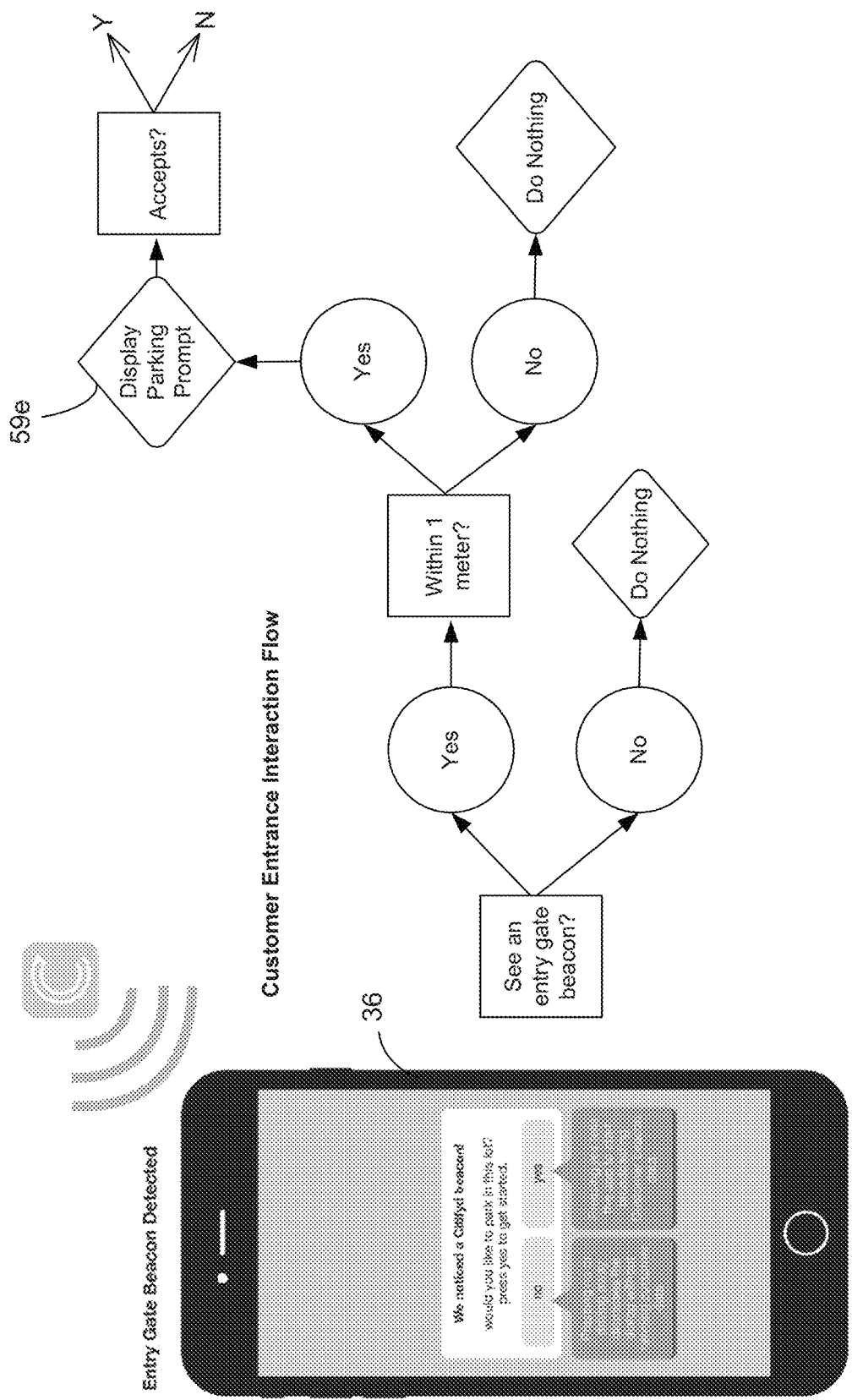

FIGS. 1, 2A, and 2B are, respectively, a simplified pictorial diagram, a component block diagram, and a software/hardware stack diagram of a source beacon 10 of the present disclosure.

With reference to FIG. 1, beacon 10 is a small self-contained device with a power supply 12, light-emitting diode (LED) indicator lights 14, and electronic components 16 housed in a durable watertight housing 18.

Figure 4:
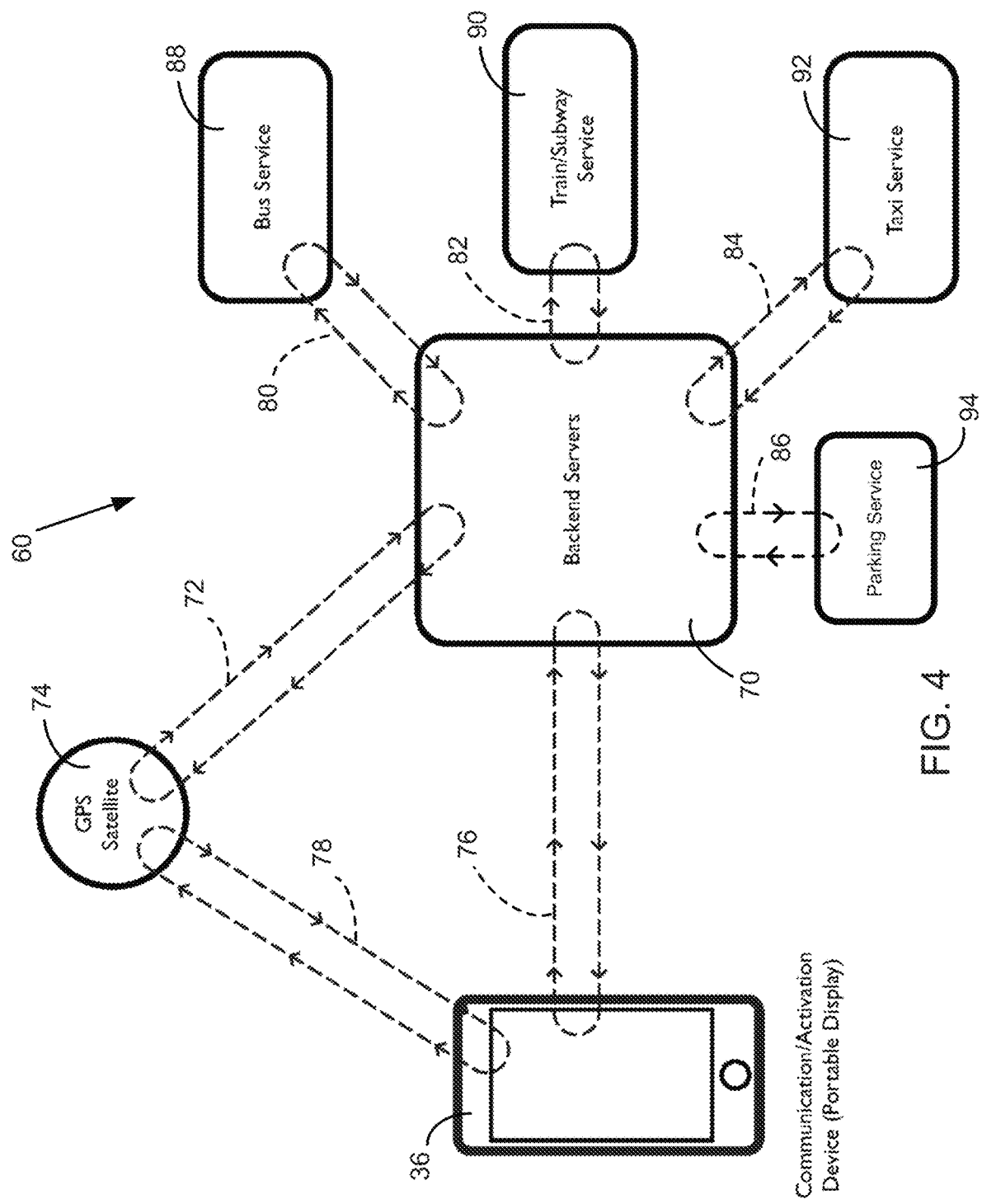
FIG. 4 is a system block diagram showing, with the source beacon of FIGS. 1, 2A, and 2B removed, the configuration and communication links between different components included in the group of main components of a parking and mass transport beacon system of the present disclosure.
Figure 5:
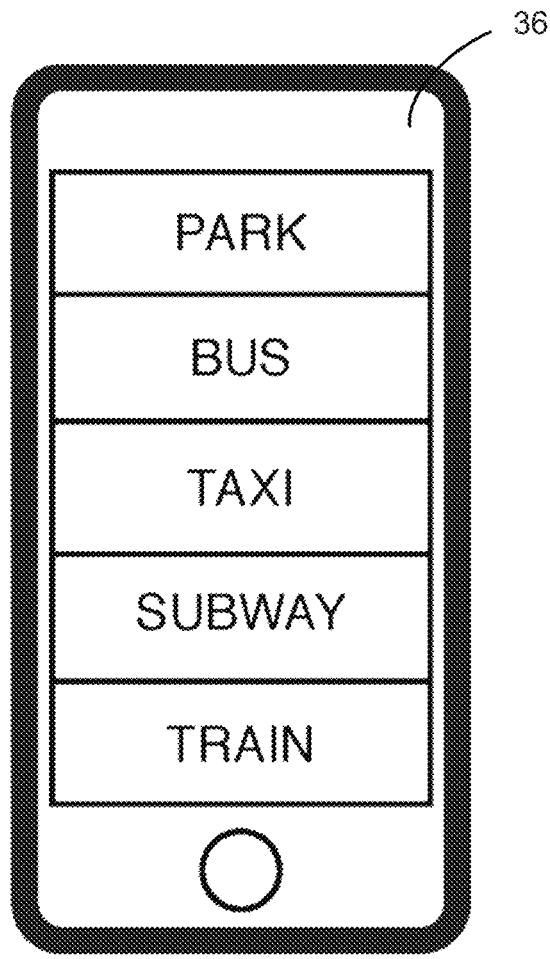
FIG. 5 is a diagram of an on-screen smartphone menu display of parking or mode of transportation activities from which a customer can select during operation of the disclosed parking and mass transport beacon system.

With reference to FIGS. 2A and 2B, beacon 10 includes a lithium polymer (LiPo) rechargeable battery functioning as power supply 12 that is connected to a power management module 20. Power management module 20 delivers appropriate voltages for application to the several electronic components 16 contained in housing 18. A power supply junction 22 provides external power supply access to beacon 10. A microprocessor 30 controls the operation of a wireless connection interface module 32, which is wireless communication circuitry using a wireless communication protocol to produce a short-range wireless radio signal (e.g., Bluetooth®, Zigbee®, or Near Field Communication (NFC) wireless communication technologies). In the embodiments described, a multiprotocol system on a chip (SoC) such as an nRF51822 Bluetooth® Smart (also called Bluetooth® low energy or BLE) and SoC having an embedded BLE signal-compatible transceiver constitutes a Bluetooth® signal interface module 32 that receives program instructions from a Bluetooth® protocol stack 34 for short range communication with a customer smart device 36 such as a smartphone (FIG. 4). Microprocessor 30 also controls the operation of a long-term evolution (LTE) module 38 implementing a standard for wireless communication of high-speed data transfer for mobile devices and data terminals. An LED driver 40 applies, in response to an LED controller 42, voltages to red, green, blue (RGB) LED indicator lights 14 providing visual status information about the operation of beacon 10. An embedded Linux operating system software module 44 provides program instructions to microprocessor 30 to control the operation of beacon 10, including LED controller 42 and Bluetooth® protocol stack 34.

Beacon 10 can be attached to many surfaces of and locations in a vehicle parking or mass transit service facility. Beacon 10 can be mounted on top of a pole supported on a floor base, allowing outdoor usage. Beacon 10 can be mounted also on a wall or other fixed structure.

Figures 2, 3A:
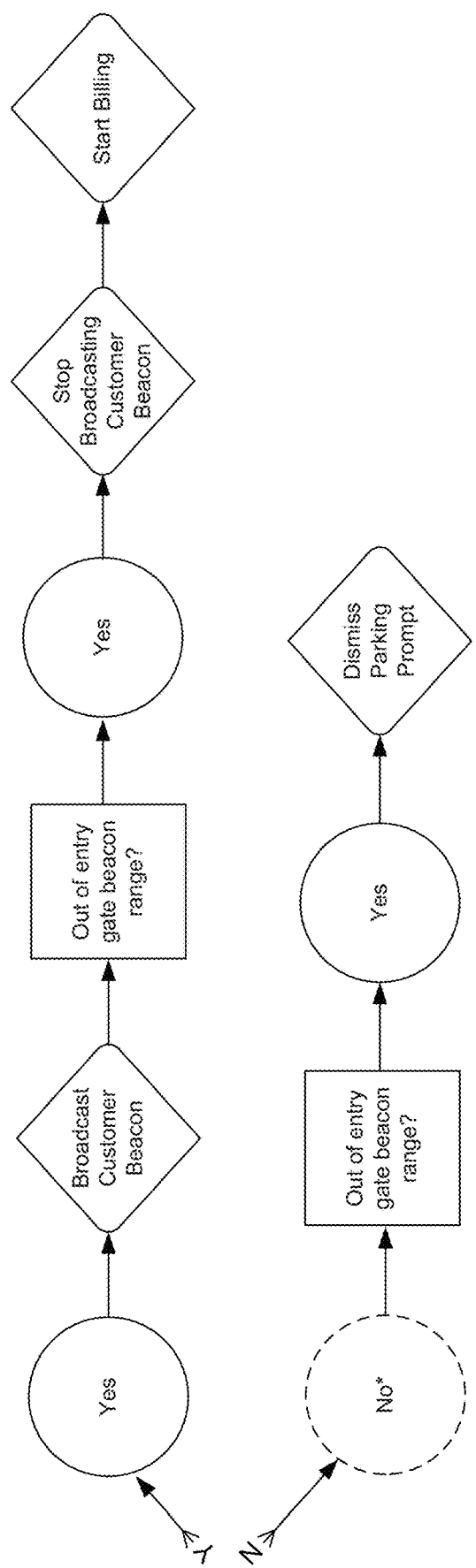
Figures 1, 3B:
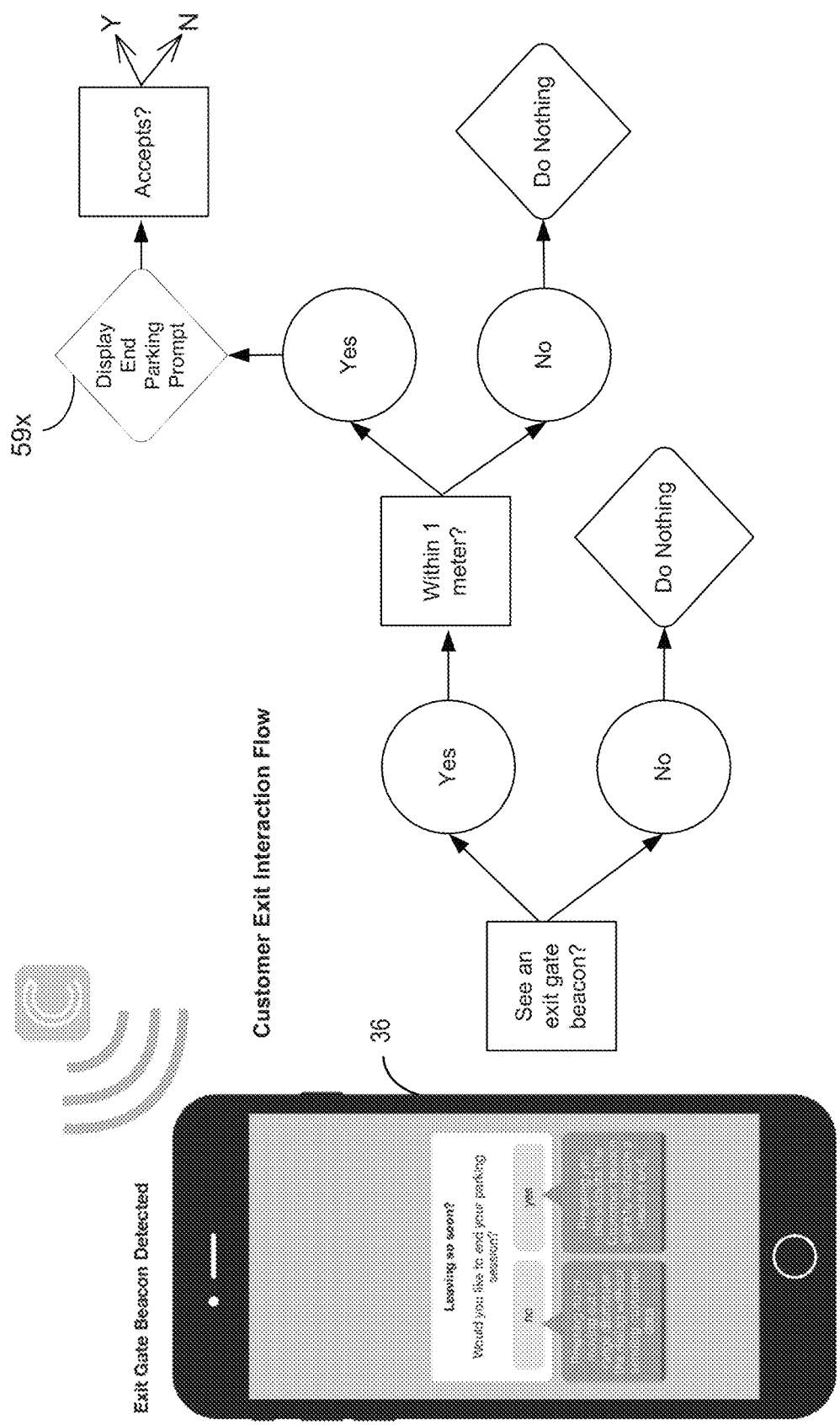
Figures 2, 3B:
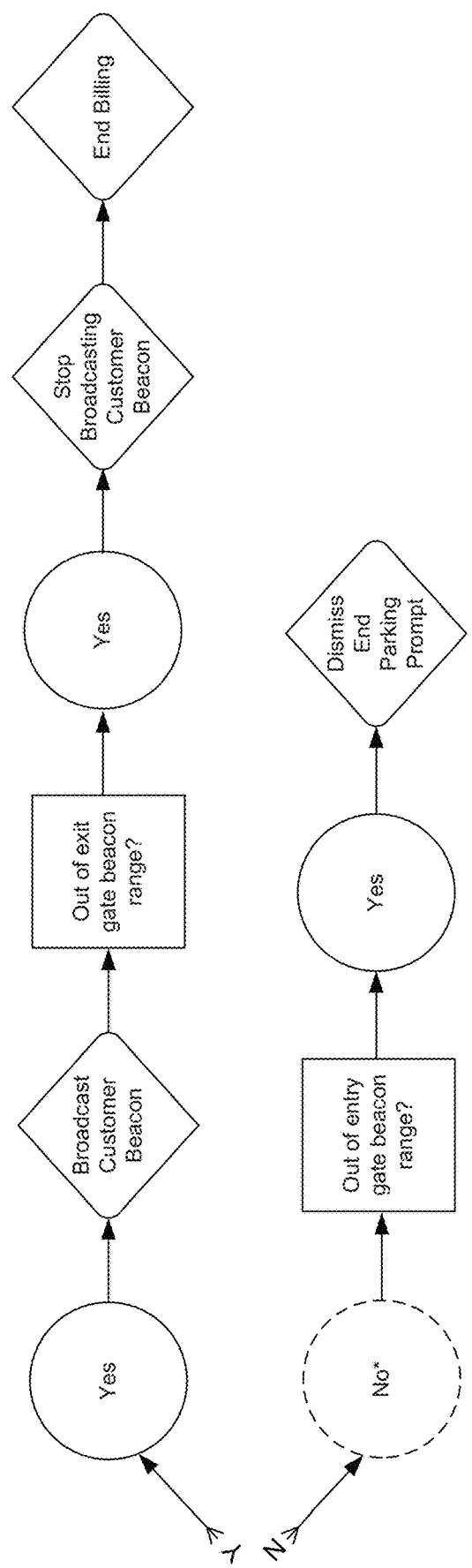
Figure 3C:
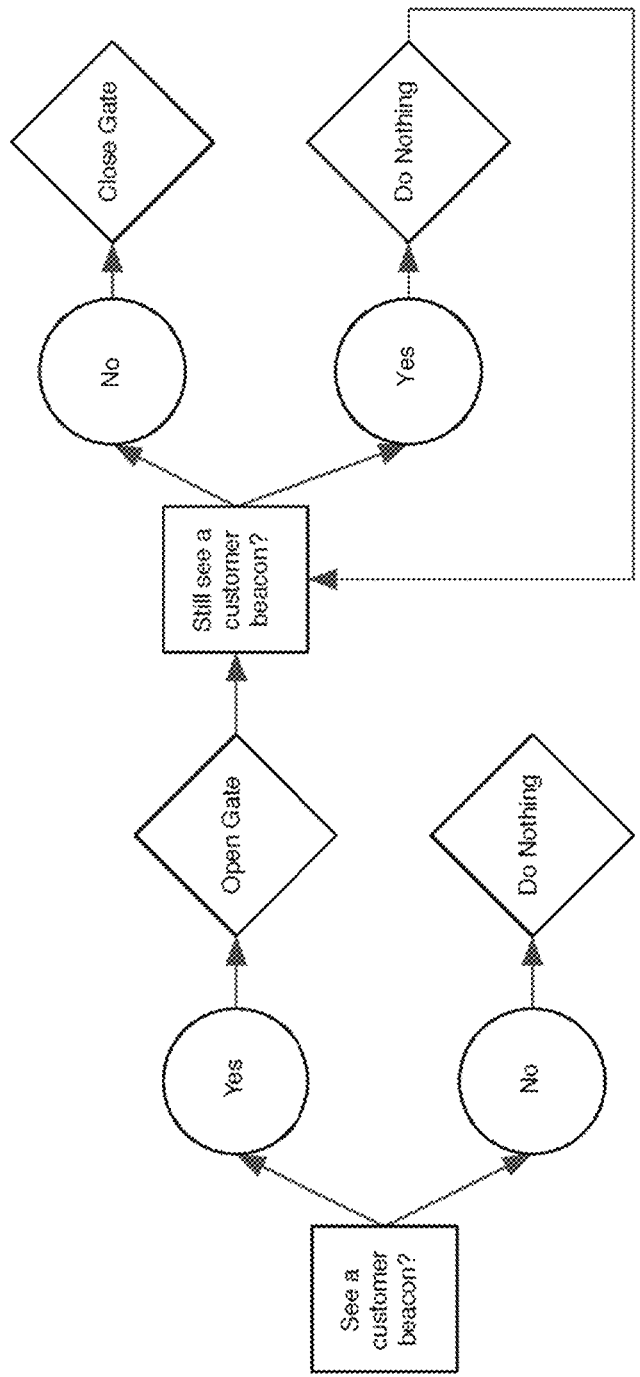

FIGS. 3A-1 and 3A-2 (hereafter, FIG. 3A), FIGS. 3B-1 and 3B-2 (hereafter, FIG. 3B), and FIG. 3C are flow diagrams outlining the process steps performed cooperatively by beacon 10 and smartphone 36 in initiating the start and the end of a vehicle parking transaction session. FIGS. 3A and 3B show, in response to detection of beacon 10 by smartphone 36, the interaction between them during the processes of, respectively, customer entrance (i.e., ingress) into and customer exit (i.e., egress) from a parking surface lot or garage facility. FIG. 3A also shows a display parking prompt produced by an App operating on smartphone 36 to appear on the display screen of smartphone 36 as the customer approaches the customer entrance, as indicated by a decision block 59e of the flow diagram. "Citifyd App" is the name given to the App operating on user smartphone 36. FIG. 3B also shows a display end parking prompt produced by the Citifyd App to appear on the display screen of smartphone 36 as the customer approaches the customer exit, as indicated by a decision block 59x of the flow diagram. FIG. 3C shows, in response to detection of the customer beacon in smartphone 36 by beacon 10, the operation of beacon 10 in the control of opening and closing an access gate of the parking facility.

In all device-to-device interactions taking place in the preferred embodiments described, smartphone 36 acts as the primary or Master device informing all secondary or Slave devices of the customer's intentions. When smartphone 36 is within range (e.g., 1 m) of beacon 10, the Citifyd App operating on smartphone 36 informs the customer of actions the customer can take. If the customer has no active vehicle parking session, the Citifyd App prompts with messaging asking whether the customer would like to start a session. If the customer is currently in an active session, the Citifyd App prompts the customer to end the session.

Beacon 10, when broadcasting, can be identified from 45 ft (13.7 m) to 230 ft (70 m) away with fair accuracy. The closer smartphone 36 is to beacon 10, the greater the accuracy. Once smartphone 36 detects beacon 10, functional data are automatically sent to and from beacon 10 without the customer's permission. The Citifyd App tracks and calculates its distance from beacon 10 and prompts smartphone 36 when a range of 1.0 m or less has been reached. The Citifyd App begins broadcasting its own advertisement data until the distance between beacon 10 and smartphone 36 exceeds 1.0 m. For a case in which beacon 10 is the sole device with Internet connectivity, beacon 10 can be configured to send from a backend server over a wireless communication link through cellular communication network protocols (FIG. 4) to smartphone 36 a push notification asking further permission for action. If the customer responds by granting permission, the Citifyd App begins broadcasting its own advertisement data until the distance between beacon 10 and smartphone 36 exceeds 1.0 m.

FIGS. 4, 5, 6, 7, and 8 are system block diagrams presented to facilitate an understanding of the following description of the operation of a vehicle parking beacon system 60 implemented with beacon 10.

FIGS. 4 and 6-8 show the main components and communication links between different ones of the main components in vehicle parking beacon system 60. FIG. 4 omits beacon 10 from system 60 to show the system infrastructure and communication links established before beacon 10 is placed in operation.

With reference to FIG. 4, system 60 includes one or more backend servers 70 (hereafter, backend servers 70) on which a parking service provider stores vehicle parking customer account information and transaction information. A preferred parking service provider is a municipality, a private parking provider, or other business organization that uses backend servers 70 to process transactions associated with established vehicle driver parking fee payment accounts. (A parking service provider could, of course, enter into a contractual arrangement with a separate entity to process transactions associated with the parking fee payment accounts.) Backend servers 70 are implemented with a communication signal interface to establish a wireless radio signal communication link 72 with a navigation system 74, such as the global positioning system (GPS) space-based satellite network, and a wireless communication link 76 through cellular communication network protocols with a smart, wireless-connection enabled mobile communication device, such as smartphone 36 carried by the customer. Smartphone 36 is implemented with a communication signal interface to establish communication link 76 and establish a wireless radio signal communication link 78 with GPS navigation system 74. Communication links 72 and 78 established with GPS navigation system 74 are used to determine, and provide backend servers 70 with, information about the location and movement of the customer carrying smartphone 36. GPS navigation system 74 knows the customer's exact location (e.g., access gate, bus stop, street corner, and the like) by tracking customer smartphone 36.

FIG. 4 shows backend servers 70 established with communication links 80, 82, 84, and 86 through wireless globally accessible information (e.g., Internet Protocol) networks with transit rider customer accounts of a bus service provider 88, a train/subway service provider 90, and a taxi service provider 92 and parking customer accounts of a parking service provider 94, respectively. Communication links 80, 82, and 84 enable bus service provider 88, train/subway service provider 90, and taxi service provider 92 to access travel activity and payment information relating to their respective transit rider customer accounts. Communication link 86 enables parking service provider 94 to access parking activity and payment information relating to its parking customer accounts.

Figure 6:
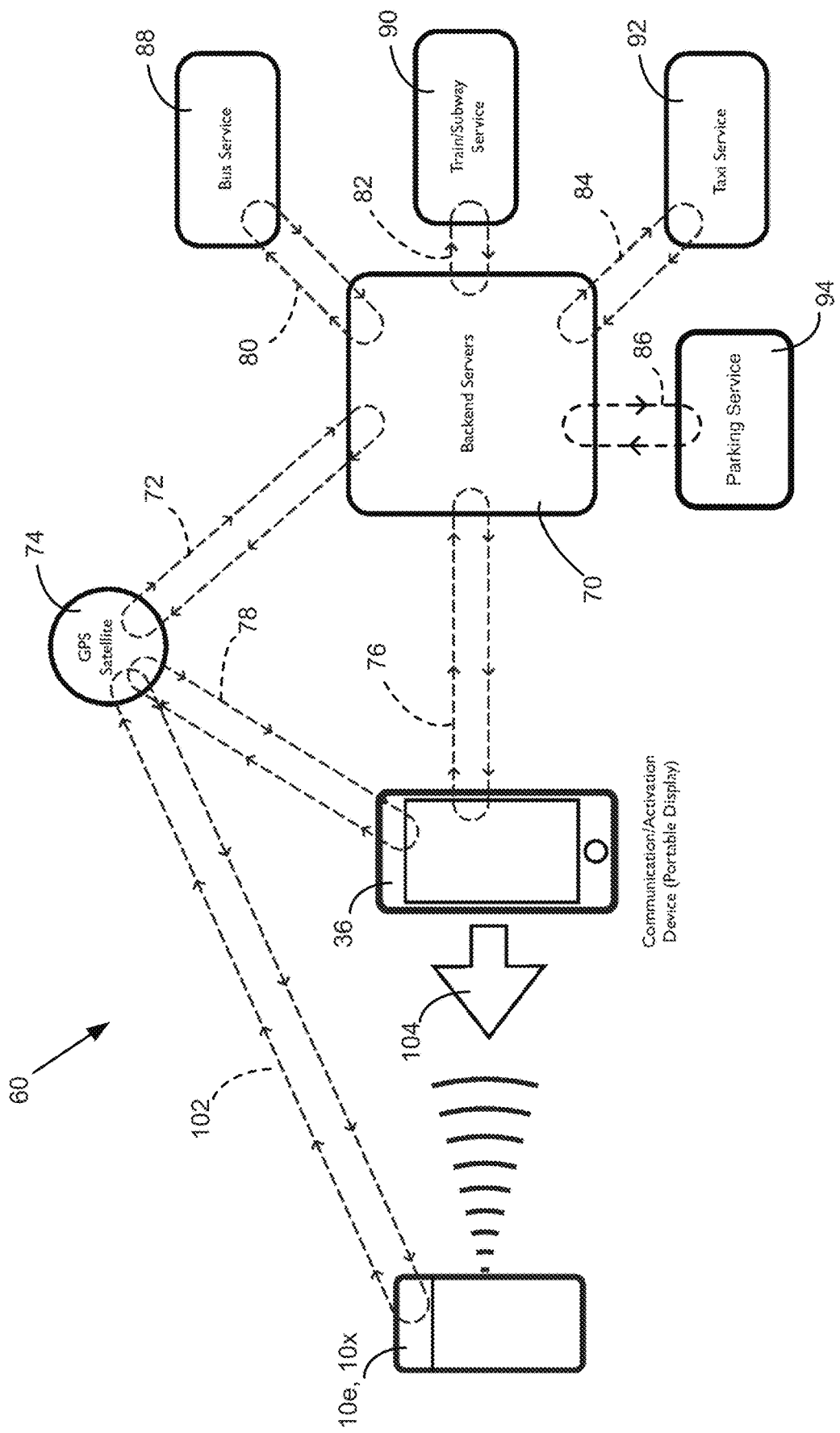
FIGS. 6, 7, and 8 show among the components of the disclosed parking and mass transport beacon system the various communication links that are active during various stages of system operation.
Figure 7:
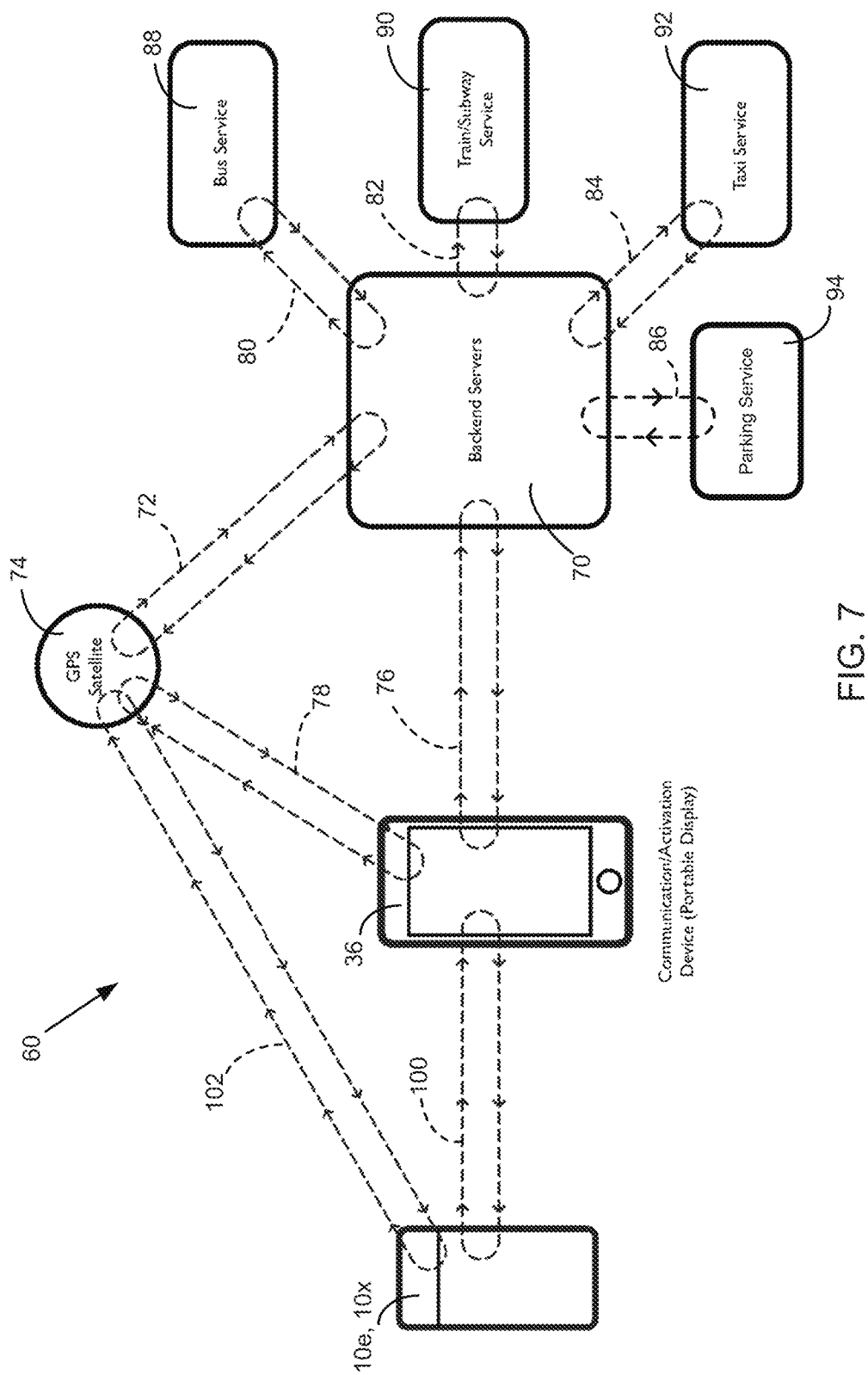
Figure 8:
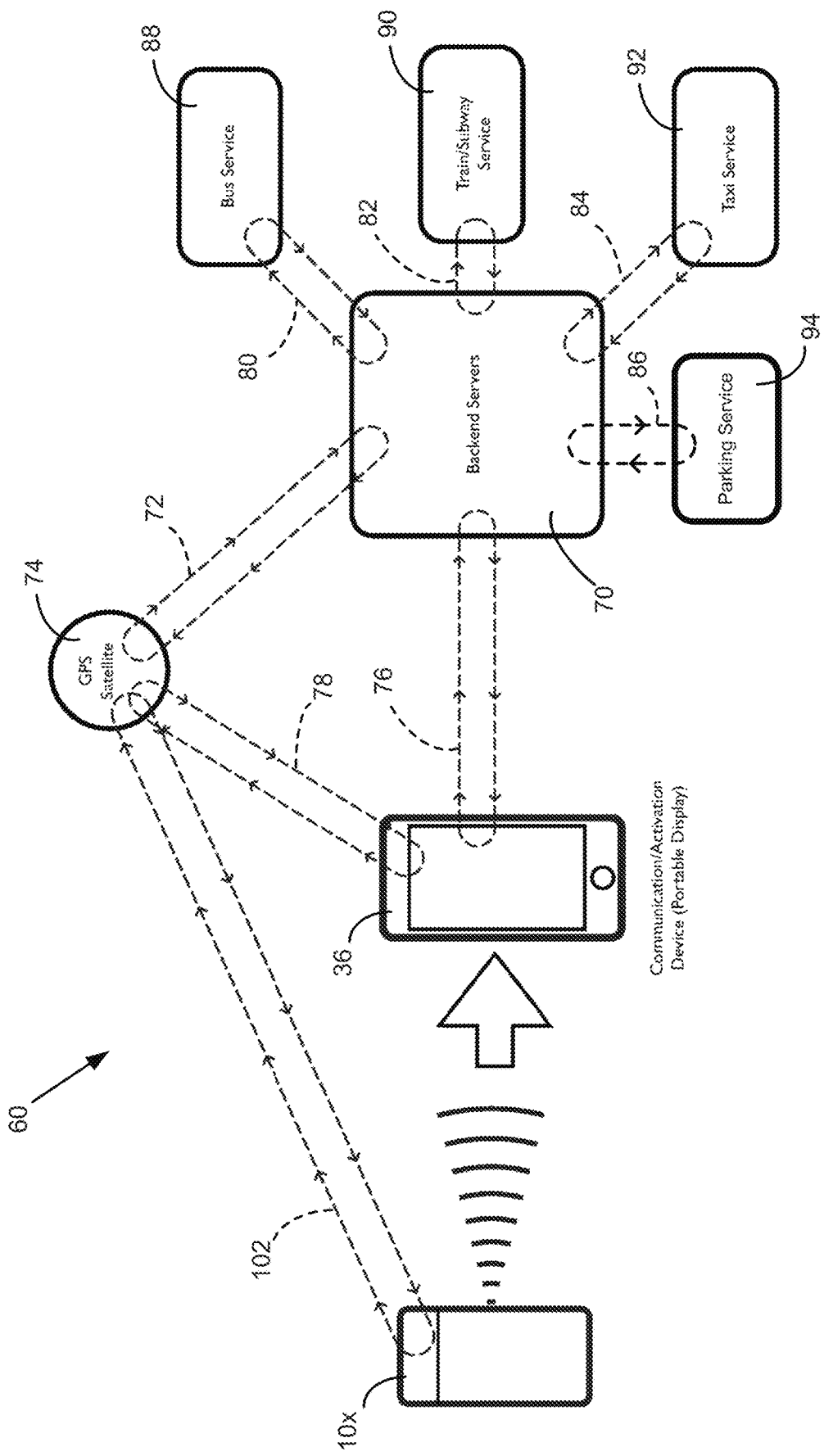

FIGS. 6, 7, and 8 show system 60 including beacon 10. With reference to FIGS. 6, 7, and 8, the radio signal produced by Bluetooth® signal interface module 32 is used to establish a wireless communication link 100 (FIG. 7)

between beacon 10 and smartphone 36. Beacon 10 is implemented with LTE communication signal interface module 38 to establish a wireless radio communication link 102 with GPS navigation system 74 to determine and provide to backend servers 70 information about the location and movement of beacon 10.

The following describes the operation of vehicle parking beacon system 60. With reference to FIG. 6, a customer's smartphone 36 is loaded with the Citifyd App provided by the operator of system 10, and backend servers 70 store account information for a transaction account set up by the customer. To enter a parking access gate, the customer taps on the screen of smartphone 36 to select an intended activity from an on-screen menu display of parking or mode of transportation activities, which are shown in the diagram of a menu screenshot presented as FIG. 5. After the customer taps the selected activity displayed, GPS navigation system 74 recognizes the location of customer smartphone 36, and perforce the location of the customer carrying it. At the same time, backend servers 70 check the customer account for authenticity, available funds, and credits and thereafter opens the account. If the account is in good order, backend servers 70 issue a "start session" identification code and create within customer smartphone 36 an authorization screen/ticket that is hidden from the customer's access and view. (The terms "parking pass" and "parking ticket" are used interchangeably throughout.) This procedure reduces the possibility of fraud because the customer cannot duplicate the authorization screen by photographing the authorization screen image and sharing it with others. The customer is now ready to park at any gated or attended parking locations that are part of system 60.

As a customer moves toward the transportation vehicle or parking access gate or attendant, an entry beacon 10e detects customer smartphone 36 at about 30-45 ft. (10.7-13.7 m) and prepares for a connection handshake 104. With reference to FIG. 7, at a preset distance (e.g., 2 ft. (0.6 m)) a connection handshake between entry beacon 10e and customer smartphone 36 is made instantly on communication link 100 through the Bluetooth protocol. If the identification/shared codes match, authentication is completed, the authorization is presented on the screen of smartphone 36, and indicator lights 14 on entry beacon 10e turn on, signaling the vehicle driver or gate attendant to allow customer entry or boarding. In the case of an access gate, instead of indicator lights 14 turning on, entry beacon 10e signals the barrier to be lifted, allowing the customer's vehicle to pass through. At this moment, the identification code also turns to a "stop session" identification code.

Figure 8A:
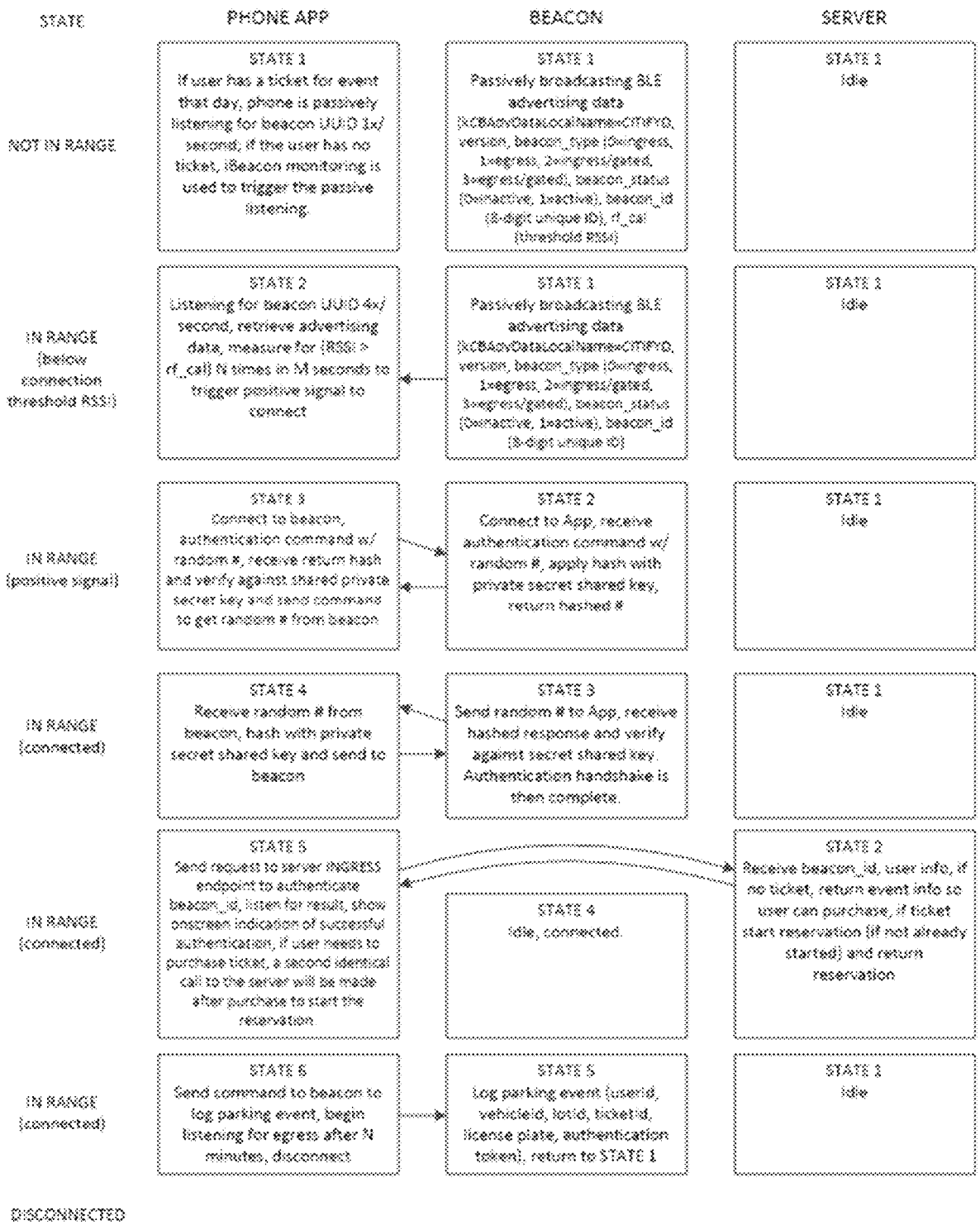
FIGS. 8A and 8B are diagrams outlining logic state flow of an entry beacon and a customer smartphone on which there is, respectively, Internet capability and no Internet capability implemented for processing ingress of a vehicle to a parking facility.
Figure 8B:
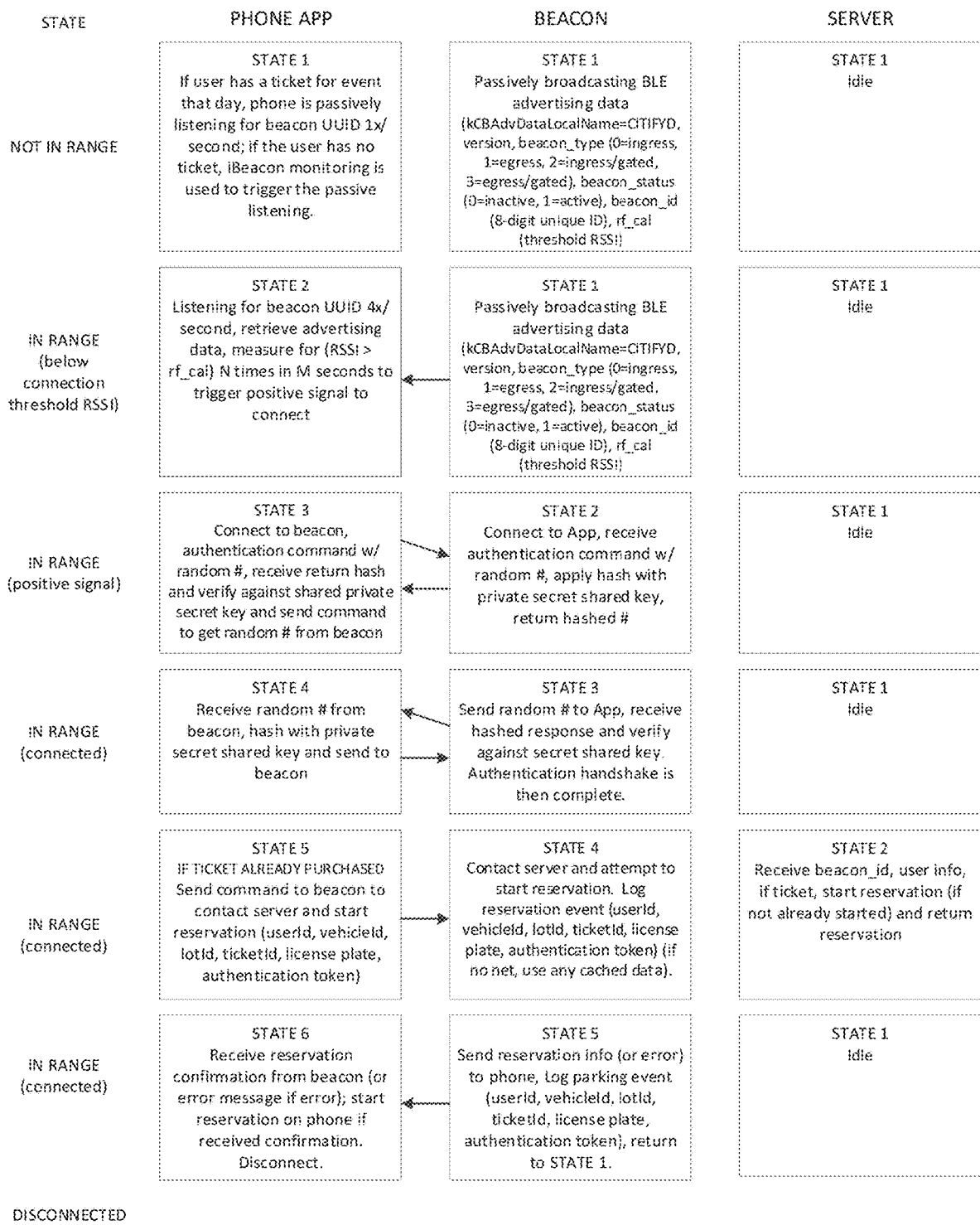

FIGS. 8A and 8B are diagrams outlining the logic state flow of the beacon and customer smartphone for parking ingress, in which there is, respectively, Internet capability and no Internet capability implemented on the customer smartphone.

The following diagram outlines the logic state flow of the beacon and customer smartphone for parking ingress, in which there is an absence of Internet capability on the customer smartphone.

With reference to FIGS. 6, 7, and 8, after the completion of travel or the vehicle parking session, as the customer disembarks the vehicle or departs from the parking surface lot or facility, an exit beacon 10x (which could be the same as entry beacon 10e if disembarkation or departure takes place through the entry door or access gate) detects the approach of the customer and prepares for connection handshake 104 (FIG. 6) and connection on connection link 100 (FIG. 7). At the present distance, connection handshake 104 is made (FIG. 6). If the identification/shared codes match, and as soon as the connection handshake on communication link 100 is broken and GPS navigation system 74 detects separation of beacon 10x (FIG. 8), the system finishes the parking session (i.e., the access gate is lifted) and the account is closed and charged appropriately. A confirmation screen with the details of the transaction is presented on customer smartphone 36.

Alternatively, as soon as GPS navigation system 74 detects the separation of beacon 10x from customer smartphone 36 with a "stop session" identification code (FIG. 8), the system finishes the parking session, and the account is closed and charged appropriately. A confirmation screen with details of the transaction is then presented to the customer.

Figure 8C:
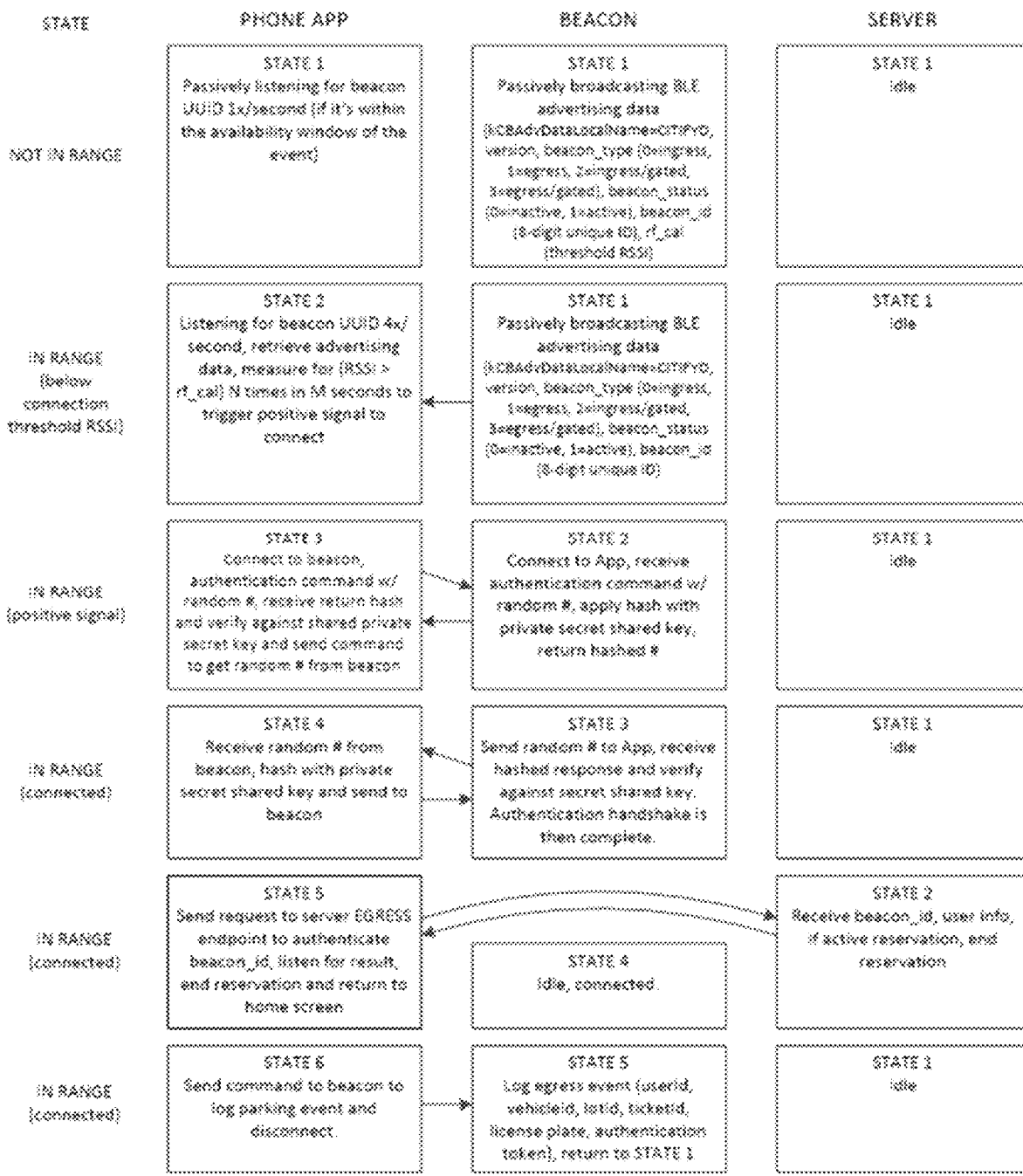
FIG. 8C is a diagram outlining logic state flow of an exit beacon and a customer smartphone for processing egress of a vehicle from a parking facility.

FIG. 8C is a diagram outlining the logic state flow of the beacon and customer smartphone for parking egress.

The process can be repeated multiple times during the day, week, or other set period, and the customer account keeps the tally. At the end of that period, the customer credit card is charged only once.

The system reliance on the cellular or Wi-Fi communication connection at the moment of authorization is eliminated or reduced, and the problem of cellular or Wi-Fi connection delays is removed by (1) performing pre-authorization and account verification before embarking or approaching a parking access gate/attendant and within the Citifyd App creating one or both of an identification code and an authorization screen hidden from the customer and (2) verifying the customer/authorization at the moment of entrance or embarkation through the connection handshake with beacon 10 only.

In the embodiments described below, the Citifyd App and SmartBeacon device are implemented with iBeacon wireless personal area network technology standard equipment, with the source beacon broadcasting regularly.

The Citifyd App operating on a customer's or user's smart device 36 (preferably, and hereafter sometimes referred to as, smartphone) scans for and monitors a SmartBeacon device. The scanning process is based on the GPS coordinates of the user's smartphone 36 and starts scanning for SmartBeacon devices in the vicinity of the user's location. The App presents to the user vehicle parking locations available in the vicinity of the user, the actual live inventory of parking spots for each parking location presented through a Live Inventory Management Engine (LIME), and identifies pricing through a Pricing Engine for each parking location. (The term parking location refers generally to a site of a surface or an open parking lot, a parking garage, or other vehicle parking facility.) The LIME and Pricing Engine operate on the backend servers. Once the user selects a parking location by one or both of advance purchasing a parking spot and landing in a parking lot that is Citifyd system-enabled with a SmartBeacon device, the App connects to the SmartBeacon device for that parking lot location. At this point, the App switches from Monitoring to a Ranging Mode for access control.

A SmartBeacon device applies a system of unique beacon ID filtering and a four-fold proximity test (i.e., ranging) to determine the appropriate SmartBeacon device to which smartphone 36 is to connect.

Backend servers 70 first provide to the App a list of unique SmartBeacon device IDs of and information associated with the nearby entrances and exits of the parking garage or lot the user driving a vehicle is entering or exiting. This information includes latitude and longitude of each of the entrances and exits, an indication whether the Smart- Beacon device is dedicated for ingress or egress, a unique identification number, and indications of the hardware sensing abilities of the SmartBeacon device (specifically, is a configuration capable of sensing when a vehicle is located over an arming loop embedded in the ground (i.e., in front of an access gate), and is the configuration capable of detecting whether the access gate wired to the SmartBeacon device is physically open).

The App distinguishes whether the user driving the vehicle is in an ingress or egress scenario, and knowing the user's location, filters out any unwanted SmartBeacon devices for the current situation and scans for only the SmartBeacon devices it desired. Furthermore, if fewer than the expected number of beacons are detected, the App assumes that another Citifyd system user is currently connected to one of the SmartBeacons and will wait until it determines that the other user has disconnected before completing the scanning process.

The four-fold ranging test procedure after this filtering process includes Tests A, B, C, and D and is as follows.

Tests A and B use iBeacon proximity value measurements, which come in as "Immediate," "Near," "Far," or "Unknown" distances from the SmartBeacon device, in conjunction with the iBeacon identifying minor value, which is an integer between 0-65535 that broadcasts the unique identification number of that iBeacon.

Test A: Does iBeacon report the SmartBeacon device as "Immediate" (<~0.5 m) or "Near" (<~3.0 m) at the instantaneous moment of measurement?

Test B: Over an interval of N seconds, were over M number of "Immediate" or "Near" proximities measured? The values of N and M are adjustable (by manual or machine learning) to fine-tune Test B.

Once tests A and B pass, the iBeacon continues ranging to maintain the validity of its results, but also begins BLE communication-enabled device discovery, which scans for connectable BLE devices. Specifically, the iBeacon scans for devices whose broadcast manufacturer data and BLE device name provide additional information as to how to connect to the device. The device-naming convention of a SmartBeacon device looks like "C2<00300", and this name is parsed for the useful data it contains. The first character identifies the device as a Citifyd system SmartBeacon device and can be used for additional identification information. The second character represents the firmware version number of the SmartBeacon, which can be used to help decide the intricacies of further communication. The third character is the ASCII code representation of the received signal strength indicator (RSSI) signal strength threshold that is required to pass Tests C and D. This character can be further adjusted by backend servers 70-side provided information received in the filtering process in order to facilitate adjustments when not in the field. The final 5 digits are again the unique identification number of the SmartBeacon device.

Test C: Over an interval of N seconds, have there been measured over M number of RSSI values that fall within the RSSI threshold defined in the device name? These N and M values can be independent from those in Test B and are adjustable to fine-tune Test C.

Test D: Over an interval of N seconds, has the Mode taken from the averaged values of all RSSI measurements been within the RSSI threshold on the device? (To take a Mode, the highest and lowest RSSI measurements in the array of RSSI measurements within the N second window are ignored.) This N value is also independently adjustable from the previous tests.

These tests, taken together, smooth out some of the moment-to-moment fluctuations in the RSSI radio signal strength of the BLE devices, thereby adding a greater degree of certainty as to the proximity of the user being within 0-3 meters of the SmartBeacon device and in all likelihood in front of the SmartBeacon device rather than to its side or behind it (the antenna on the SmartBeacon device is slightly directional).

If all four Tests A, B, C, and D are passed, the App assumes that the proximity of the user's vehicle is within a few feet of the access gate or SmartBeacon device. At this time, a connection is made between the user's smartphone and the SmartBeacon device, and a security handshake (password or shared private key exchange) takes place. Commands can then be sent between the App and the SmartBeacon device.

The SmartBeacon device also has the ability to look for Citifyd system App-enabled mobile devices for detection of the signal strength of the user's mobile device. Such ability enables the SmartBeacon devices to broadcast to which mobile device the SmartBeacon device believes is closest, thereby adding, effectively, a Test E.

Once user's smartphone 36 and the SmartBeacon device are connected, if the information provided by a SmartBeacon/Gateway indicates that the parking access gate and SmartBeacon device are able to determine whether the user's vehicle is located over a magnetic loop detector 490 (FIG. 12) associated with the vehicle travel lane in front of the access gate, the App instructs the SmartBeacon device to poll the signal coming from the magnetic loop detector and allow the user to open the access gate only when that signal is positive. The SmartBeacon/Gateway is housed either in a container residing at the parking location or as part of an augmented vision system sensor unit, if it is installed at the parking location. At this time, the App also uses the motion detection hardware present in user's smartphone 36 to determine whether the user is indeed driving a vehicle and allows the user to open the access gate only when that condition is also satisfied. If neither the magnetic loop detector signal condition nor the vehicle motion condition is satisfied, the App, instead of providing on the smartphone screen a button to open the access gate, produces an on-screen call to action that instructs the user to pull forward the vehicle over the magnetic loop or return to the user's vehicle. The use of either one or both of the magnetic loop detector and motion detection hardware prevents accidental activation of a vehicle parking transaction session. Once the user presses an on-screen button provided in the App to open the access gate, the App begins polling a signal to detect whether the access gate opened (again if the SmartBeacon/Gateway indicates that this feature is available) and begins or ends a user's parking session on backend servers 70 once the successful opening of an access gate has been detected. If this signal fails to occur, the SmartBeacon/Gateway is notified of the failure and the user is given further on-screen instruction to troubleshoot the situation.

The App also has the ability to customize the SmartBeacon devices to the installed spaces. Because each parking garage inherently has variable signal-to-noise characteristics, the SmartBeacon device can be set to match the environment of installation through a set of proximity calibration set points that compensate for the variabilities for each site of installation.

The SmartBeacon device operating in coordination with integrated vision devices is capable of assigning detected objects to object tables in an object detection module at the point of entry and allow a pricing range for the sizes and types of the objects (such as, for example, trucks, sedans, motorcycles). The objects are reviewed in the vehicle travel lane's "field of vision" of the SmartBeacon device, and the pictorial proximities of the objects with respect to one another, as well as with respect to the SmartBeacon device (in multiple lanes of mixed ingress and egress), are determined.

Figure 9:
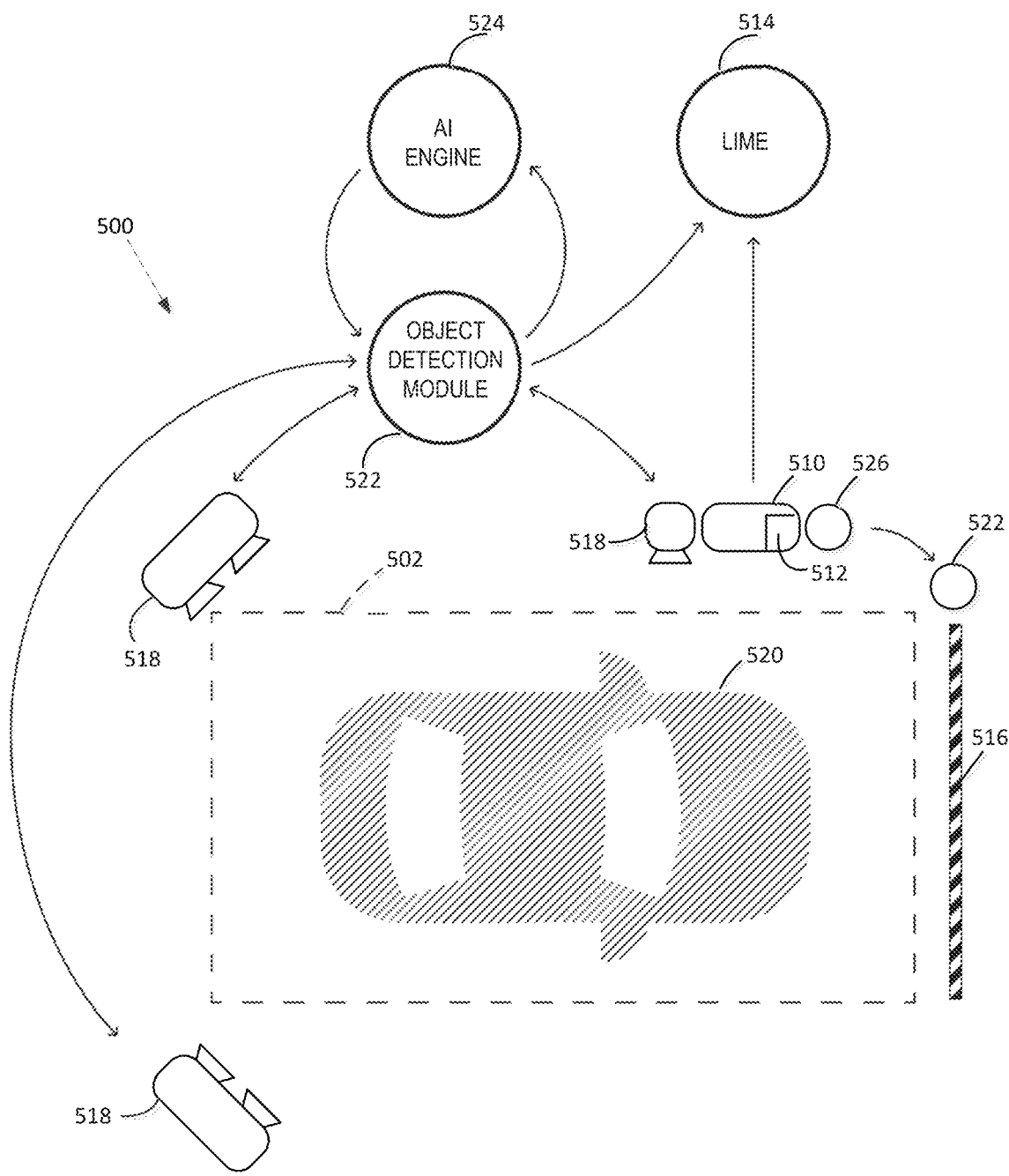
FIG. 9 is a block diagram showing the major components of a system in which a SmartBeacon device operates in coordination with integrated vision devices to control and process vehicle parking.

FIG. 9 shows a SmartBeacon device operating in coordination with integrated vision devices to form a system 500 that assigns values representing type, price, and other attributes to objects entering a detection area 502. A SmartBeacon device 510 includes a SmartBeacon/Gateway 512, to which general reference was previously made. System 500 including its source beacon component SmartBeacon device 510 are configured and operate as described with reference to system 60 and source beacon 10, respectively, in accordance with the enhancements set forth below. SmartBeacon/Gateway 512 is a computing platform with CPU control center, WiFi wireless connectivity, BLE, Ethernet system protocol, LTE network, and USB standard interface capabilities and performs the following functions: acts as a secure network router that connects all sensor and other smart devices to the Citifyd system virtual network; runs a LIME Vision Agent 514; performs all SmartBeacon device 510 functions; manages communications to any existing access gates 516; performs indoor positioning in accordance with Citifyd system-specific positioning methodologies, including use of two inline beacons positioned a specific distance between them in one vehicle travel lane as described below with reference to FIG. 12; performs manageability functions, such as operational health of SmartBeacon devices 510, the components of the computing platform, and the Citifyd system as a whole; and enables remote software upgrades.

SmartBeacon device 510 with augmented vision system sensors 518 identifies an object 520 (shown and referred to as a vehicle) and the direction of travel of the object 520 requesting access to a parking structure. Vision system sensors 518 placed around detection area 502 also identify the type of object 520. Vision system sensors 518, depending on the site application, may include, for example, one or more of an IR sensor, a camera, a thermal sensor, a magnetometer, a pressure sensitive bar, a sound sensor, a light detection and ranging (LIDAR) sensor, a laser-based depth sensor, a motion sensor, and a beam break technology-based sensor. Vision system sensors 518 use an object detection module 522 as part of a LIME Agent 514 vision system software component to assign a proper identification to the current object 520 in detection area 502.

Vision processing entails the use of the Open Source Computer Vision Library (OpenCV Library) with its deep neural network (DNN) execution environment. OpenCV Library is a cross-platform library of programming functions mainly directed to real-time computer vision. LIME Agent 514 uses DNN associated with Mobile Net-SSD, with site-specific training. Mobile nets are for mobile and embedded vision applications and are based on architecture that uses depthwise separable convolutions to build light weight deep neural networks. OpenCV 3.4.1 is a deep learning module with Mobile Net-SDD for object detection. The source code can be downloaded from https://opencv.org.

This comparison is strengthened over time through an AI Engine 524 operating in backend servers 70 to compensate for environmental variations. AI Engine 524 recognizes changes in ambient environment over time. Such changes include, for example, effects of weather on background illumination, daylight and nighttime conditions, and an oversize vehicle straddling two parking spaces. AI Engine 524 enables performing parametric changes in vision system sensors 518 to compensate for such environmental changes.

If the user has access to software that can interact with SmartBeacon device 510, it in turn can activate an NFC/RFID communicator 526 to cause an access gate controller 528 to open access gate 516, allowing vehicle entry into the parking structure. Regardless of whether SmartBeacon device 510 and NFC/RFID communicator 526 granted access to the user, LIME Agent 514 operating in backend servers 70 and executing instructions on SmartBeacon/Gateway 512 is updated with the type of object 520, inventory count, and other metrics collected in detection area 502 once object 520 passes through access gate 516 and into the parking structure.

The vision-based SmartBeacon device 510 utilizes raster/vector-based algorithms that delineate and distinguish between object 520 and the direction of travel. Sensors 518 and objects 520 are correlated through object detection module 522. For an open surface lot environment, such as that shown in FIG. 11, an accessory pole-mounted vision system that processes images at the source (edge processing vision system) and transmits only a set of relevant interpolated results to SmartBeacon/Gateway 512 through cellular tower connection or other methods (including the App) for transmitting the fully interpolated data to SmartBeacon/Gateway 512. This vision system can also be installed for gated lots as well as private lots.

LIME Agent 514 has the ability to process video streams from vision system sensors 518 and detect vehicles of interest in each video frame it processes. LIME Agent 514 implements AI methodologies such as deep neural network systems with a pretrained detection library for objects of interest such as, for example, cars, trucks, sport utility vehicles, buses, trailers, motorcycles, delivery trucks, and bicycles. It can use video frame subtraction methodologies to identify moving objects. The detection system of LIME Agent 514 has the capability to decipher vehicle type, size, location, license plate, and other unique identifiers, such as make and model, color, and vehicle beacon IDs. LIME Agent 514 software includes a kernelized correlation filter (KCF) tracking framework, a core component of which is a discriminative classifier that distinguishes between a target and surrounding environment. The source code can be downloaded from https://github.com/joaofaro/KCF/cpp. LIME agent 514 implemented with a KCF tracking architecture has the ability to track multiple detected vehicles within predefined localized region(s) of interest and calculate relative motion vectors for each vehicle. The tracking module of LIME Agent 514 uses a combination of movement prediction and actual image characteristics of each vehicle for tracking. This system has the ability to resolve for stagnant cars within the region of interest and track partly occluded objects. The system activates vehicle processing by locking on to each vehicle within the region of interest and thereafter computes net movement to ingress or egress after the vehicle is no longer within the region of interest. LIME Agent 514 communicates information relating to egress and ingress vehicle movements through a secure representational state transfer (REST) application-programming interface (API) to backend servers 70. LIME Agent 514 has an ability to change vision system sensor settings to compensate for environmental variations. LIME Agent 514 is also implemented with redundant processing in cooperation with a thermal sensor to provide an ability to compensate for environmental conditions in which a typical RGB camera is impaired (such as snow, extremely low light, or fog) by switching to different sensors as appropriate for the given environment (for example, switching to LIDAR, a thermal sensor, or an IR sensor). This would entail switching to, for example, a thermal sensor and loading an associated neural network training file for thermal images.

Figure 10:
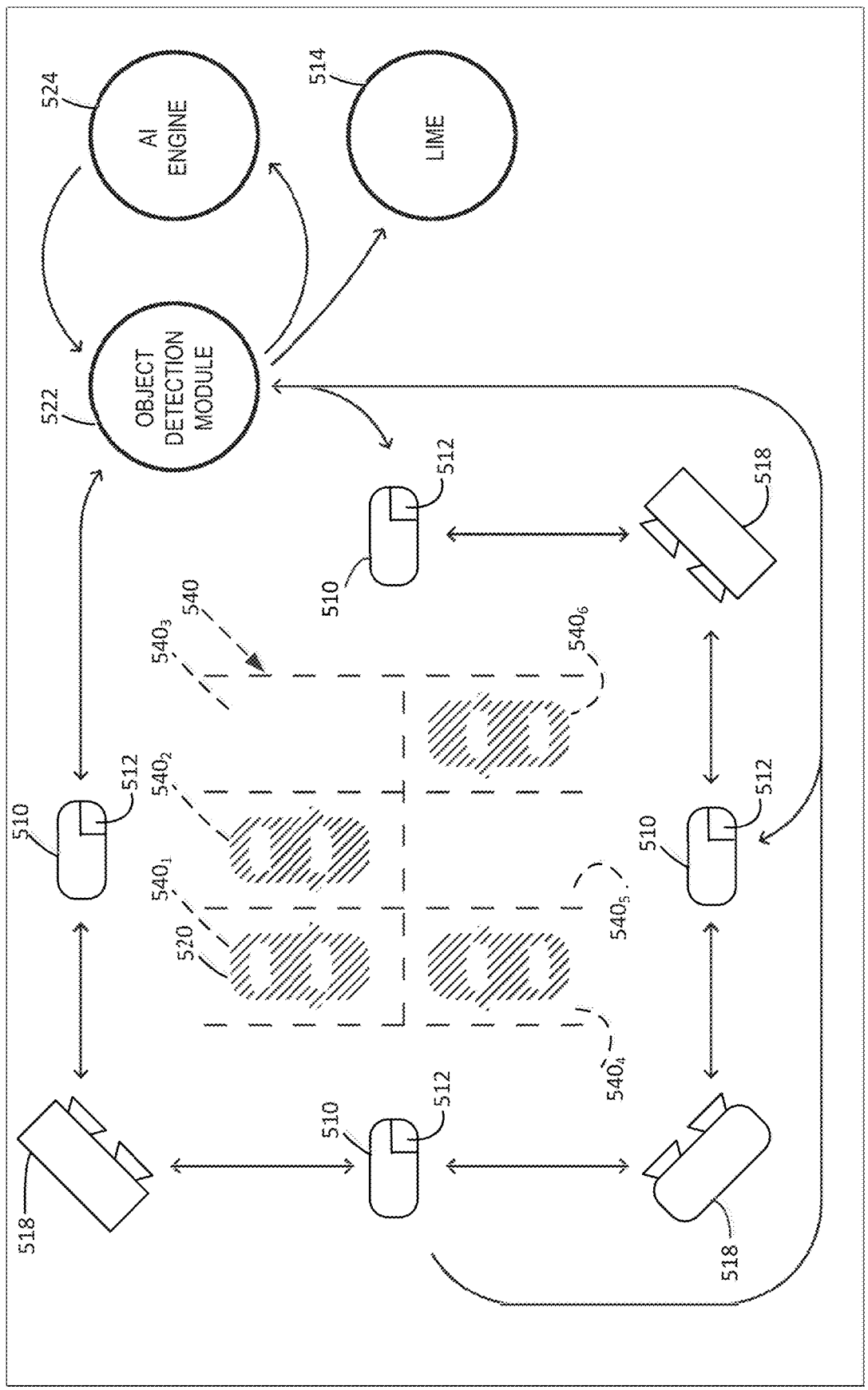
FIG. 10 is a block diagram showing for a parking lot a detection area including multiple vehicle parking spaces for use in describing the operation of a Live Inventory Management Engine.
Figure 11:
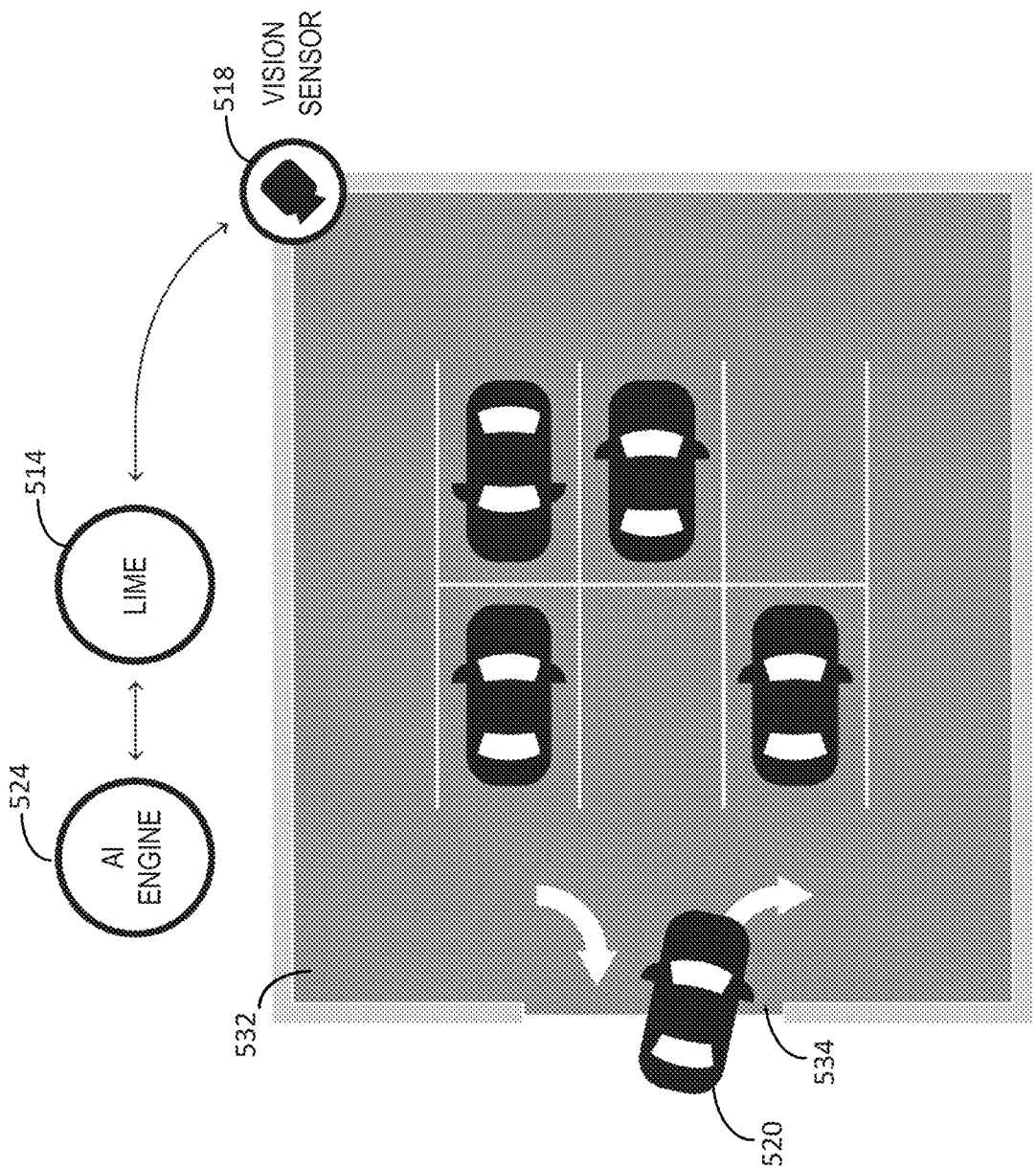
FIG. 11 is a diagram showing vehicle ingress and egress travel paths at an access region of an ungated surface parking lot monitored by a vision sensor.

FIG. 10 shows three vision system sensors 518 and four SmartBeacon devices 510 placed at different locations around six vehicle parking spaces or spots $540_1$, $540_2$, $540_3$, $540_4$, $540_5$, $540_6$ in a detection area 540 to implement LIME Agent 514. Surface and gated lots can also be equipped with a pole-mounted vision system to identify available parking spots for local spot guidance/navigation. FIG. 11 shows a vision system sensor 518, preferably a camera, placed to monitor an ungated surface parking lot 532 to identify available parking spots in it. Use of a camera to monitor ungated surface parking lot 532 enables detection of instances of ingress and egress of vehicle 520 through access region 534 and thereby facilitates recordation of a vehicle parking transaction session. An object/space detection algorithm continuously compares images of larger areas to determine a change in the "state" of a parking spot through "object/spot comparisons algorithms." The methodology delineates available parking spots (i.e., parking spots $540_3$, $540_5$) as compared to occupied parking spots (i.e., parking spots $540_1$, $540_2$, $540_4$, $540_6$) through a vectorized methodology, as compared to rasterized methodology, for rapid processing. The comparison of an occupied parking spot with respect to a background (unoccupied reference) enables the open lot parking spot navigation through vision systems that are interpolated at the vision system sensor and only the relevant resulting data are transmitted through the network.

LIME Agent 514 provides public and private connectivity for identifying live inventory data for all parking lots in the Citifyd system, as well as an independent channel for LIME Agent 514 for entities outside of the Citifyd system. The algorithm compensates for weather variation, along with other environmental factors, by recalibration of reference points through AI Engine 524 with various live feed and sensor inputs. Background reference points are compared from time to time as a result of sensors input data, as well as other live feeds (e.g., weather pattern). Random reference comparison points and times are determined through a self-learning AI Engine 524 (cluster of vision system sensors 518). These vision system sensors 518 are used to activate and unleash self-learning environmental parameters and patterns that can improve the calibration of reference points. Vision system sensors 518 that collect the input for AI Engine 524 may include RF heat detectors in combination with a depth sensing vision system, stereo camera clusters with variable depth of field adjustment per installation, along with an RGB camera system. The RGB camera system is connected to the Citifyd SmartBeacon system, which is edge processor-enabled and extrapolates and interpolates one or both of object movements and stationary objects in larger areas.

The combination of multiple SmartBeacon sensors data and RGB remote camera systems distinguishes between objects, the heat pattern from objects, as well as the depth of an object and thereby continuously enhances AI Engine 524 for the specific installation and site specific data. AI Engine 524 has the ability to coordinate and feed reference geographic based data for other nearby (zone) locations.

A stereo camera system operating as a sensor can detect patterns of movements of objects in entry and exit vehicle travel lanes. Stereo camera sensors can be a combination of RGB and RF, along with other depth sensing signals.

RFID (active) communicators are enabled at SmartBeacon device 510 for enabling access gate control without direct wiring to the access gate mechanism. This bypasses the direct connection and, as an option, coordinates inventory counts through the vision system and LIME Agent 514 for gated parking garages.

A Lot Navigator application operating as part of LIME Agent 514 in backend servers 70 is a localized navigation option for larger parking garages that need to direct incoming users to an available open parking space in the parking garage. The Lot Navigator option directs a user in a vehicle to a specific available spot through a map overlay of the lot in the Lot Navigator. The communication for the Lot Navigator is coordinated between multiple clusters of SmartBeacon devices 510 in conjunction with GPS coordinates that connect through thread communication protocol to SmartBeacon/Gateway 512 and backend servers 70. An example of the protocol is a WiFi network or a clustered beacon network using IEEE 802.15.4 protocols. The use of multiple pole-mounted vision system sensors facilitates an ability to communicate a full lot composite image to backend servers 70 for the purpose of open spot discovery. Lot Navigator uses and references comparative images from the pole-mounted vision system sensors 518 to the reference background image to identify an available spot through LIME Agent 514. LIME Agent 514 has the ability to locally log to backend servers 70 all communications, including false positive images and negative images, locally or to backend servers 70 as necessary. False positive images are objects that are identified erroneously as vehicles. Negative images are vehicles that were missed by object detection module 522. The vectorization computation and comparison is improved through AI Engine 524 on a regular basis to compensate for environment variations.

The Lot Navigator uses the following equipment to direct incoming users to an available parking space. Pole-mounted vision system sensors 518 report changes in inventory by reporting objects that result in change against a reference background image. This comparison is strengthened over time through AI Engine 524 to compensate for environmental variations. Communication between vision system sensors 518 and object detection module 522 happens through SmartBeacon devices 510 clustered around the parking structure. SmartBeacon devices 510 act as a communication conduit between vision system sensors 518 and SmartBeacon/Gateway 512 and backend servers 70 through thread communication protocol (e.g., WiFi, IEEE 802.15.4 protocols, and LTE). Changes in parking space state—occupied or empty—are communicated through LIME Agent 514 to the Lot Navigator by updating a map overlay of the parking structure. This information is passed along to the user through an application that will guide the user to an empty, assigned parking space.

Figure 12:
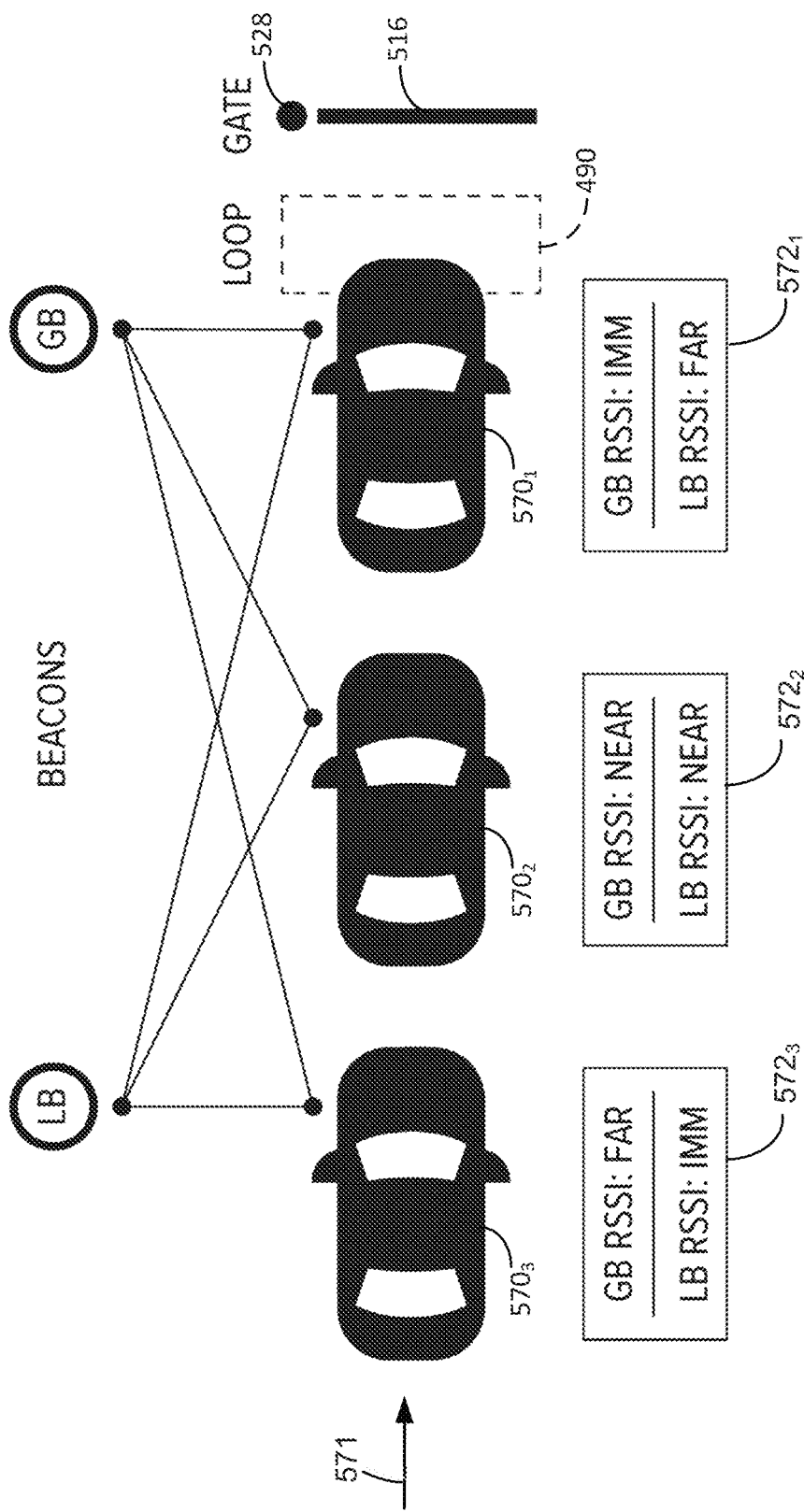
FIG. 12 is a diagram showing three vehicles arranged in a queue to illustrate a triangulation vehicle detection technique.

To facilitate description of an optional triangulation technique that is especially useful for vehicle detection at an ingress or egress access gate of a system not implemented with vision sensors, FIG. 12 presents a diagram showing vehicles $570_1$, $570_2$, and $570_3$ arranged in a queue along a vehicle travel lane 571 selectively blocked by operation of access gate 516. The disclosed triangulation technique overcomes unreliable vehicle detection stemming from variable BLE signal absorption by different numbers of passengers occupying vehicles approaching access gate 516 to either enter or exit a parking location. The objective is to open access gate 516 to allow passage to the vehicle that is closest to access gate 516, regardless of RSSI value variations resulting from hyper local environmental conditions in the vehicles (e.g., more or fewer occupants) while establishing a queue near the passage access gate beacon.

A SmartBeacon device 510 (referred to as a gate beacon, GB) positioned near access gate 516 is separated by a known distance from a standard BLE signal-emitting beacon (referred to as a lane beacon, LB) positioned along the travel lane. Gate beacon GB and lane beacon LB are preferably separated by 14 ft. (4.3 m), which is a distance of about two vehicle lengths, shown in FIG. 12 as extending between locations proximally forward of the lower sides of the windshields of vehicles $570_1$ and $570_3$. Gate beacon GB and lane beacon LB emit radio signals of substantially the same strength. Gate beacon GB and lane beacon LB cooperate to eliminate, irrespective of the number of passengers occupying a vehicle in the queue, the effect of signal absorption, which affects the RSSI radio signal strength measured by the smart device.

In FIG. 12, boxes $572_1$, $572_2$, and $572_3$ represent the GB RSSI and LB RSSI ratios of strengths of measured radio signals emitted by gate beacon GB and lane beacon LB for vehicles $570_1$, $570_2$, and $570_3$, respectively. Box $572_3$ shows, for vehicle $570_3$, an RSSI ratio of <1 because of the immediate proximity of vehicle $570_3$ to lane beacon LB relative to the far away distance from gate beacon GB. Box $572_2$ shows, for vehicle $570_2$, an RSSI ratio of about 1 because of the near proximity of vehicle $570_2$ to each of lane beacon LB and gate beacon GB. Box $572_1$ shows, for vehicle $570_1$, an RSSI ratio of >1 because of the immediate proximity of vehicle $570_1$ to gate beacon GB relative to the far away distance from lane beacon LB.

The RSSI ratios indicate the order of vehicles $570_1$, $570_2$, and $570_3$ in the queue, with RSSI ratio=1 representing a tipping point at which the vehicles closest to and farthest from access gate 516 exhibit the largest fraction >1 and the smallest fraction <1, respectively. The App operating on the smart device transmits the RSSI ratio information to gate beacon GB, which either causes the App carried by an occupant in vehicle $570_1$ to produce an on-screen button for access gate control or causes access gate controller 528 to open access gate 516 for vehicle $570_1$ to pass through.

The triangulation technique for vehicle detection is configured for use in multi-lane vehicle parking facilities, which often install access gate structures on a common lane divider. This technique enables opening the correct access gate associated with a gate beacon for a vehicle traveling in the lane associated with and positioned next to the access gate.

Figure 13:
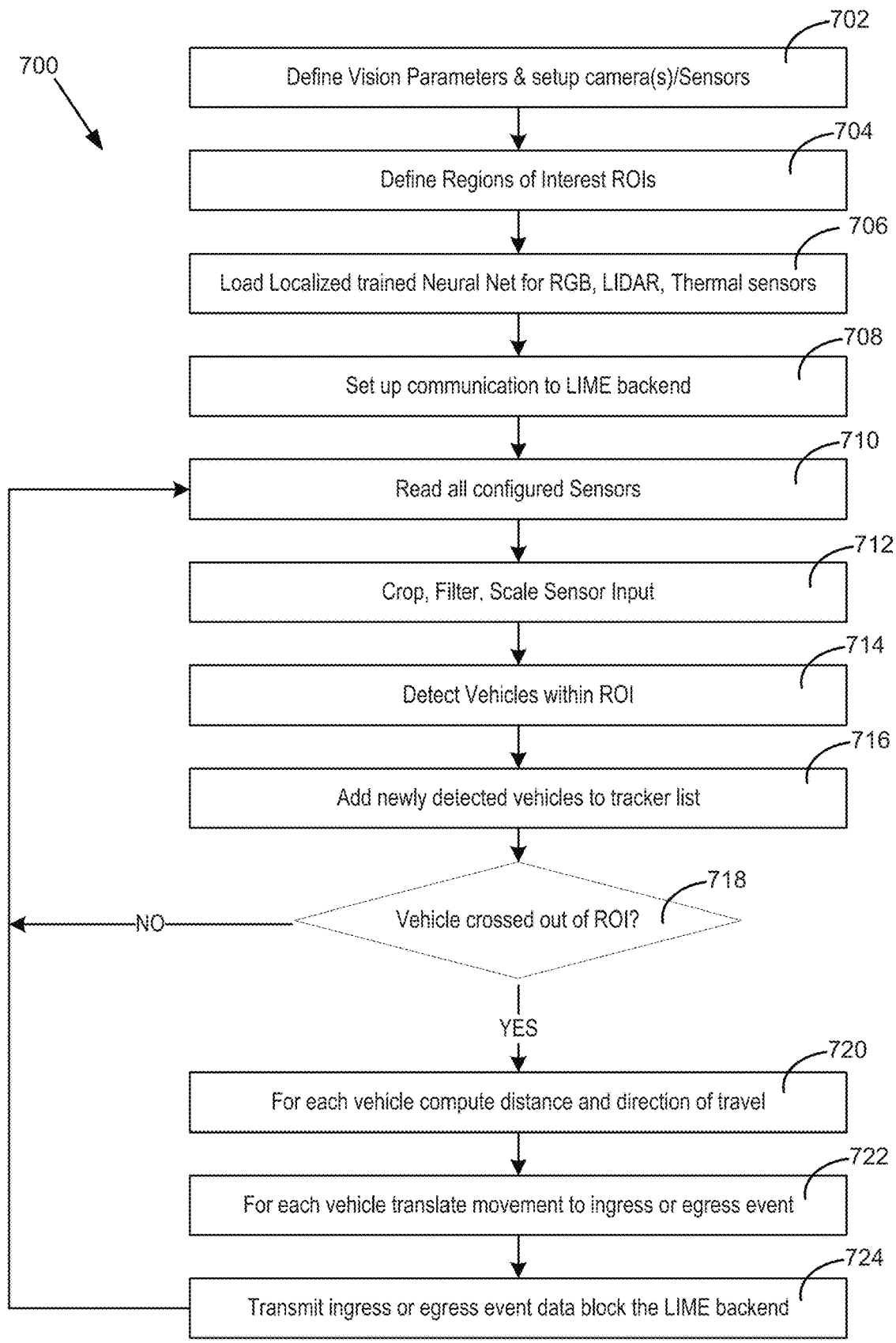
FIG. 13 is a flow diagram showing the operational process and algorithm for performing vehicle detection by the disclosed parking objects detection system.

FIG. 13 is a flow diagram 700 showing the operational process and algorithm for performing vehicle detection by system 500. The first four process blocks represent the functions performed to set up vision system sensors 518, LIME Agent 514, and communication links. Process block 702 defines vision parameters and sets up the cameras and sensors of vision system sensors 518. Process block 704 defines regions of interest (ROI) for observation in detection area 502. Process block 706 represents loading of a localized trained neural network in LIME Agent 514 for RGB camera, LIDAR, and thermal sensors. Process block 708 represents a set up for establishing a communication link for LIME Agent 514 to backend servers 70.

Upon completion of the communication link setup, vehicle detection is made ready to be performed in accordance with the following procedure. Process block 710 represents continual reading of all configured vision system sensors 518, and process block 712 represents cropping, filtering, and scaling of their inputs. Process block 714 represents detection of vehicles within the defined regions of interest. Stream video is received and processed for the regions of interest. Restricting the segment of the video to be analyzed is defined in the setup represented by process block 702. Use of variable selectable frame rates allows for efficient processing. Once a vehicle is detected, object detection module 522 verifies that it meets initial criteria for objects of interest. The resulting vehicles are verified and classified through object detection module 522 using a deep neural network (DNN). The deep neural network uses an initial training file and is augmented with site-specific training parameters. Process block 716 represents adding newly detected vehicles to a tracker list. Once verified, the vehicle is passed on to a tracking module in LIME Agent 514 and verified to be the same in predefined or random intervals through the deep neural network. The vehicles are tracked with the customized areas of interest in a manner that, if occluded, will continue to be tracked through a predicted path within a region of interest and re-verified through the deep neural network. Decision block 718 represents an inquiry whether any of the vehicles have crossed out of the region of interest. If the answer is NO, decision block 718 represents a return to the vehicle detection processing operation of process block 710, where all of the configured vision system sensors 518 are read. Travel movement within the region of interest of vehicles is vectorized to determine the distance and direction of travel with respect to the boundaries of the region of interest. If the answer is YES, decision block 718 directs processing to process block 720, where the distance and direction of travel is computed for each vehicle that crossed out of the region of interest. Process block 722 represents a determination of movement of each vehicle as either an ingress or egress event. Process block 724 represents transmission of ingress or egress event data to LIME Agent 514 operating in backend servers 70. Once it exits an area of interest, a vehicle is removed from the tracking module and an image of the local vehicle is stored for scheduled use to update the training file for the parking location (e.g., parking lot). Process block 724 represents a return to the vehicle detection processing operation of process block 710, where all of the configured vision system sensors 518 are read.

It will be obvious to those having skill in the art that many changes may be made to the details of the above-described embodiments without departing from the underlying principles of the disclosure. The scope of the invention, should, therefore, be determined only by the following claims.

The invention claimed is:

1. A parking vehicle detection system, comprising:
first and second beacons present at, and configured to broadcast their identities by emitting short-range wireless radio signals from, different locations associated with an access region of a vehicle parking location, the different locations exhibiting location-specific inherent signal-to-noise characteristics, and the first and second beacons being calibrated with respective first and second signal strength connection thresholds matching corresponding ones of the location-specific inherent signal-to-noise characteristics, the first and second beacons configured to establish on short-range wireless communication links connectivity with multiple smart devices, each of the multiple smart devices associated with a different one of multiple vehicles arranged in a queue along a travel lane and implemented with radio frequency wireless technology to scan for beacon radio signals in a vicinity of the smart device and to provide location-based information content, and the first beacon configured to form handshake connections with the multiple smart devices;

a mobile application operating on the multiple smart devices and enabling each of them to initiate and conclude a vehicle parking session; and a backend server in communication with the multiple smart devices through long-range wireless communication links, the backend server storing for delivery to the mobile application identities of vehicle parking locations in the vicinity of the multiple smart devices, and, on each of the multiple smart devices, the mobile application performing a ranging procedure to determine whether a first distance between the smart device and the first beacon and a second distance between the smart device and the second beacon are within specified amounts corresponding to the respective calibrated first and second signal strength connection thresholds, measuring signal strengths of the short-range wireless radio signals emitted by the first and second beacons to determine a ratio value of radio signal strengths that corresponds to a position of the vehicle in the queue, and causing the smart device to transmit the ratio value to the first beacon, the first beacon using the ratio values transmitted to it by the multiple smart devices to identify a first vehicle of the multiple vehicles in the queue occupying a first position that is adjacent to the first beacon, and the mobile application operating on the smart device associated with the first vehicle forming a handshake connection with the first beacon to enable activation of a vehicle parking transaction session.

2. The parking vehicle detection system of claim 1, in which a live inventory management agent operating in the backend server provides to the mobile application live parking spot inventory information for at least one of the vehicle parking locations in the vicinity of the multiple vehicles.

3. The parking vehicle detection system of claim 2, in which a lot navigator program operating in the backend server cooperates with the live inventory management agent to guide a user operating the first vehicle to an open parking spot in a vehicle parking location.

4. The parking vehicle detection system of claim 1, further comprising a magnetic detector cooperating with the smart device and the first beacon while in handshake connection with each other to detect the first vehicle to prevent accidental activation of a vehicle parking transaction session.

5. The parking vehicle detection system of claim 1, in which one of the multiple smart devices includes a motion sensor to determine whether a user accompanied by the smart device is driving the vehicle with which the smart device is associated.

6. The parking vehicle detection system of claim 1, further comprising system sensors operating in coordination with the first beacon to form a detection area in the vehicle parking location, the system sensors and the first beacon identifying vehicles and directions of travel of the vehicles in the detection area.

7. The parking vehicle detection system of claim 6, in which the system sensors include an IR sensor, a camera, a thermal sensor, a magnetometer, a pressure sensitive bar, a sound sensor, a light detection and ranging (LIDAR) sensor, a laser-based depth sensor, a motion sensor, or a beam break technology-based sensor, or a combination of them.

8. The parking vehicle detection system of claim 1, further comprising:

multiple system sensors operating in coordination with the first beacon to define a detection area of a parking location; and an object detection module that assigns identification attributes to vehicles present in the detection area to provide live inventory management of parking spots in the vehicle parking location.

9. The parking vehicle detection system of claim 8, further comprising an AI engine operating in the backend server to compensate for environmental variations in the detection area to enhance the identification attributes of the vehicles present in the detection area.

10. The parking vehicle detection system of claim 8, in which, to define a parking space state of the vehicle parking location, the multiple system sensors report changes in inventory of the parking spots in the vehicle parking location by providing vehicle image information that represents a change with reference to vehicles present in a background image stored in a live inventory management agent, the live inventory management agent operating in the backend server and including a lot navigator application to which changes in the parking space state are communicated, the lot navigator application providing, to the smart device associated with the first vehicle and accompanying a user, information for use by an application operating on the smart device to guide the user to an empty parking spot.

11. The parking vehicle detection system of claim 1, further comprising an access barrier positioned in the access region of a vehicle parking location, and in which the activation of a vehicle parking transaction session includes enabling operation of the access barrier.

12. The parking vehicle detection system of claim 1, in which the first beacon short-range wireless radio signal and the second beacon short-range wireless radio signal being transmitted for measurement by the mobile application operating on each of the multiple smart devices are used to determine respective signal ratios that indicate the positions of the multiple vehicles arranged in the queue.

13. The parking vehicle detection system of claim 1, in which the first and second beacons are positioned a known distance between them in line along the travel lane.

14. The parking vehicle detection system of claim 1, in which the first beacon is installed near a barrier controlling vehicle ingress to or egress from the access region of a vehicle parking location.

15. The parking vehicle detection system of claim 14, in which the barrier is a gate.

16. The parking vehicle detection system of claim 1, in which the first beacon is implemented in a mobile device.

17. The parking vehicle detection system of claim 1, in which the second beacon is a Bluetooth® low energy (BLE) signal-emitting beacon.

* * * * *